US008648820B2

(12) United States Patent
Sensu

(10) Patent No.: US 8,648,820 B2
(45) Date of Patent: Feb. 11, 2014

(54) OPERATION CONSOLE, ELECTRONIC EQUIPMENT AND IMAGE PROCESSING APPARATUS WITH THE CONSOLE, AND OPERATION METHOD

(75) Inventor: Minami Sensu, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 287 days.

(21) Appl. No.: 12/957,840

(22) Filed: Dec. 1, 2010

(65) Prior Publication Data

US 2011/0128247 A1 Jun. 2, 2011

(30) Foreign Application Priority Data

Dec. 2, 2009 (JP) ................................. 2009-274446

(51) Int. Cl.
*G06F 3/041* (2006.01)
(52) U.S. Cl.
USPC ........... 345/173; 358/1.5; 358/1.13; 358/1.14
(58) Field of Classification Search
USPC .................. 345/156–184, 1.1–111, 204–215;
715/773; 358/468, 442, 475, 1.14, 358/1.15; 399/75
See application file for complete search history.

(56) References Cited

U.S. PATENT DOCUMENTS

| 5,912,659 | A * | 6/1999 | Rutledge et al. ............... 345/156 |
|---|---|---|---|
| 6,724,370 | B2 * | 4/2004 | Dutta et al. .................... 345/169 |
| 6,771,494 | B2 * | 8/2004 | Shimano ................... 361/679.06 |
| 7,030,862 | B2 * | 4/2006 | Nozaki ......................... 345/173 |
| 2005/0018658 | A1 | 1/2005 | Ikeda et al. |
| 2005/0210031 | A1 * | 9/2005 | Kasatani .......................... 707/10 |
| 2005/0219611 | A1 * | 10/2005 | Yamashita et al. ............ 358/1.15 |
| 2006/0203014 | A1 * | 9/2006 | Lev et al. ....................... 345/659 |
| 2006/0227106 | A1 | 10/2006 | Hashimoto et al. |
| 2006/0268335 | A1 * | 11/2006 | Okada ........................... 358/1.15 |
| 2007/0059032 | A1 * | 3/2007 | Yamada et al. ............... 399/107 |
| 2007/0247641 | A1 | 10/2007 | Okuma et al. |
| 2007/0285675 | A1 * | 12/2007 | Okada et al. .................... 358/1.1 |
| 2008/0039202 | A1 * | 2/2008 | Sawano et al. .................. 463/39 |
| 2008/0048986 | A1 * | 2/2008 | Khoo ............................ 345/168 |
| 2009/0058819 | A1 * | 3/2009 | Gioscia et al. ................ 345/173 |
| 2009/0064023 | A1 | 3/2009 | Kudo |
| 2009/0088218 | A1 * | 4/2009 | Kim et al. ...................... 455/566 |
| 2009/0100380 | A1 * | 4/2009 | Gardner et al. ............... 715/854 |
| 2009/0109649 | A1 * | 4/2009 | Harris et al. .................... 362/23 |
| 2010/0134816 | A1 * | 6/2010 | Dantwala ..................... 358/1.13 |
| 2011/0090151 | A1 * | 4/2011 | Huang et al. .................. 345/168 |

FOREIGN PATENT DOCUMENTS

| JP | 3-116193 | A | 5/1991 |
|---|---|---|---|
| JP | 4-088412 | A | 3/1992 |
| JP | 11-327760 | A | 11/1999 |
| JP | H11-327760 | * | 11/1999 |
| JP | 2000-148367 | A | 5/2000 |

(Continued)

*Primary Examiner* — Chun-Nan Lin
(74) *Attorney, Agent, or Firm* — Birch, Stewart, Kolasch & Birch, LLP

(57) ABSTRACT

In an image forming apparatus including software buttons and hardware buttons, a log-in image is displayed, and when input of a log-in name by a user is completed, determination is made as to whether an operation device used at that time is hardware buttons. If the operation device is hardware buttons, the image forming apparatus erases a software keyboard from a display panel, and if the operation device is not the hardware buttons, turns off a hardware button lamp.

1 Claim, 19 Drawing Sheets

(56) References Cited

FOREIGN PATENT DOCUMENTS

| JP | 2000-353042 A | 12/2000 |
| JP | 2003-345506 A | 12/2003 |
| JP | 2005-31882 A | 2/2005 |
| JP | 2005-174181 A | 6/2005 |
| JP | 2006-146330 A | 6/2006 |
| JP | 2006-293477 A | 10/2006 |
| JP | 2007-293416 A | 11/2007 |
| JP | 2008-134918 A | 6/2008 |
| JP | 2009-64181 A | 3/2009 |
| JP | 2009-75656 A | 4/2009 |
| JP | 2009-169493 A | 7/2009 |

* cited by examiner

FIG. 4

| USER NAME | NUMBER OF USE OF SOFTWARE BUTTONS AT LOG-IN (IN PAST 6 MONTHS) | NUMBER OF USE OF HARDWARE BUTTONS AT LOG-IN (IN PAST 6 MONTHS) | OPERATION DEVICE | NUMBER OF SAMPLES | RATIO S | RATIO H |
|---|---|---|---|---|---|---|
| USER0001 | 12 | 9 | NOT YET DETERMINED (RATIO UNSATISFIED) | 21 | 57% | 43% |
| USER0002 | 4 | 20 | HARDWARE BUTTONS | 24 | 17% | 83% |
| USER0003 | 20 | 4 | SOFTWARE BUTTONS | 24 | 83% | 17% |
| USER0004 | 7 | 33 | HARDWARE BUTTONS | 40 | 18% | 83% |
| USER0005 | 1 | 17 | HARDWARE BUTTONS | 18 | 6% | 94% |
| USER0006 | 22 | 0 | SOFTWARE BUTTONS | 22 | 100% | 0% |
| USER0007 | 15 | 2 | SOFTWARE BUTTONS | 17 | 88% | 12% |
| USER0008 | 8 | 1 | NOT YET DETERMINED (RATIO UNSATISFIED) | 9 | 89% | 11% |
| USER0009 | 25 | 3 | SOFTWARE BUTTONS | 28 | 89% | 11% |
| USER0010 | 18 | 0 | SOFTWARE BUTTONS | 18 | 100% | 0% |
| ... | ... | ... | ... | ... | ... | ... |

OPERATION CONSOLE, ELECTRONIC EQUIPMENT AND IMAGE PROCESSING APPARATUS WITH THE CONSOLE, AND OPERATION METHOD

CROSS-REFERENCE TO RELATED APPLICATION

This nonprovisional application claims priority under 35 U.S.C. §119(a) on Patent Application No. 2009-274446 filed in Japan on Dec. 2, 2009, the entire contents of which are hereby incorporated by reference.

BACKGROUND OF THE INVENTION

1. Field of the Invention

The present invention relates to an operation console functioning as a user interface and, more specifically, to an operation console having two or more operation devices or one operation device operated by two or more methods of operation, to satisfactorily meet the request of operation by the user. The present invention further relates to electronic equipment and image processing apparatus having such an operation console, as well as to an operation method.

2. Description of the Background Art

As one type of image processing apparatuses as electronic equipment, image forming apparatuses forming images on recording paper (typically, copy machines) are introduced to many places of business (companies and offices). In such a place of business, it has become increasingly common to connect an image forming apparatus having a printer function or a copy function to a network, to allow use (sharing) by a plurality of users. A multifunction peripheral (MFP) as one type of such image forming apparatuses has a plurality of basic modes such as a copy mode, a facsimile mode (hereinafter "facsimile" may also be denoted as FAX or fax), a network-supported printer mode and a scanner mode. In such an image forming apparatus, each user selects a basic mode and sets a function of duplex (two-sided) printing or collective printing (such as 2-in-1 by which two pages of an original document are printed on one sheet, or 4-in-1 by which four pages of an original document are printed on one sheet), whereby images are formed on sheets of paper in a desired manner. Appropriate combinations of these functions come to be more frequently used.

When a user uses such an image forming apparatus, for example, the user inputs image data in the scanner mode, performs image processing (such as collection) by inputting various instructions through an operation panel, and prints the results in the printer mode. In such a situation, the operation panel serving as an operation and display unit functions as an interface between the image forming apparatus and the user. Generally, operation status of each mode is displayed on the operation panel, to allow the user to grasp the operation status mode by mode. In the printer mode that is executed upon reception of data from external equipment, operation status of each function may be displayed in accordance with the data received from the external equipment as a source.

Recently, a touch-panel display having a touch-panel overlapped on a liquid crystal panel comes to be increasingly used as such an operation panel. By way of example, items (software buttons) allowing selection of a mode of the image forming apparatus are displayed on the touch-panel display, the user viewing the display presses a position of an item displayed on the touch-panel display (presses a software button), and the mode is set.

Such a touch-panel display having both the display and operation functions is advantageous in that it eliminates the necessity of providing a display unit and an operation unit separately. Further, since a command can be selected in accordance with a trajectory of pressing by the user's finger, a command can be selected advantageously in accordance with the user's sense. Examples of such command selection using finger trajectory include the following.

Assume, for example, that a plurality of pages are displayed on the touch-panel display as print previews. By a user operation of lightly tapping twice (hereinafter also referred to as double-tapping) a position of a certain page displayed as a preview, the page is displayed enlarged or reduced in size. By a user operation trajectory of expanding a space between two fingers (hereinafter also referred to as pinch-out or pinch-open), the page is displayed enlarged in size, and by a user operation trajectory of reducing a space between the two fingers (hereinafter also referred to as pinch-in or pinch-close), the page is displayed reduced in size. In the following, these operations are denoted as gesture operations. The gesture operations are not limited to the above, and may include: tapping, or lightly touching an item displayed on the touch-panel display; dragging, or sliding an item with a finger; flicking, or lightly sweeping an item to scroll; and pinching with two fingers. It is noted that the tapping and double-tapping are not detected by the user operation trajectory on the touch-panel display (determined by detecting not the trajectory but a position). However, since the user's request can be detected by these operations as well, these operations are included in the gesture operations in the present specification.

A user who is accustomed to the operation of hardware buttons (so-called contact buttons) forming a conventional operation unit is not familiar with such operations of the touch-panel display. For instance, the touch-panel display has no movable mechanism and, therefore, a user may feel strange as he/she does not have the sense of pressing an item. Such a user may be puzzled with the operation of touch-panel display.

As a solution to such a problem, an image forming apparatus configured to allow connection of an external, optional keyboard has been known. Japanese Patent Laying-Open No. 2006-146330 (hereinafter referred to as "'330 Reference") discloses a display device used for assisting input operations through an external keyboard, when the external keyboard is connected to an image forming apparatus and the external keyboard is operated by a user watching a screen of a display unit of the image forming apparatus.

The display device is provided on an image forming apparatus, and it includes a display unit, an input unit, a detecting unit and a control unit. The display unit displays control items related to an operation of the image forming apparatus. The input unit is for entering inputs related to the control items displayed on the display unit. An external keyboard having a plurality of operation keys is detachably connected to the display device. The detecting unit detects whether or not the external keyboard is connected to the display device. When connection of the external keyboard is detected by the detecting unit, the control unit allocates operation keys of the external keyboard to inputs of control items in accordance with the progress status of operation of the image forming apparatus, and displays characters of the operation keys in association with the control items, on the display unit.

In the display device of the image forming apparatus, when connection of the external keyboard to the image forming apparatus is detected, the operation keys of the external keyboard are allocated to allow inputs related to the control items displayed on the display unit of the image forming apparatus, in accordance with the progress status of the operation of image forming apparatus. Since the characters of operation keys are displayed on the display unit in correspondence with the control items, even when the operation keys to be operated are changed in response to the progress of operation of the image forming apparatus changes, the characters of the operation keys to be operated can still be displayed on the display unit. This improves user convenience. When connection of the external keyboard is not detected, characters of the operation keys are not displayed on the display unit. Therefore, unnecessary information is not displayed, so that the user may not be confused.

Japanese Patent Laying-Open No. 2003-345506 (hereinafter referred to as "'506 Reference") discloses a technique related to the gesture operation mentioned above, in which page arrangement is determined in accordance with a trajectory of finger movement of the user who moved the finger while pressing the touch-panel display, when collection of pages is desired while forming images.

In electronic equipment represented by image forming apparatuses and image processing apparatuses, a touch-panel display is provided as an operation console. In consideration of users not familiar with the touch-panel display, external keyboards have been proposed. As can be seen from '330 Reference, a technique of assisting input through the keyboard has also been known.

According to '330 Reference, when the external keyboard is connected, characters of operation keys are displayed on the touch-panel display to facilitate user input. In such a situation, command selection realized by an operation of an operation key (hardware button) of the external keyboard and command selection realized by pressing a software button displayed on the touch-panel display are both effective.

For an image forming apparatus shared by a large number of users, it is desirable to provide a plurality of operation devices (software buttons/hardware buttons) or a plurality of operation methods (gesture operation/non-gesture operation), from the viewpoint of addressing accessibility or user preference related to operations. Such a configuration, however, may impair rather than improve operability, since a plurality of operations are prepared for selecting one command. In addition, when a plurality of operation devices or operation methods are provided in this manner, the number of items displayed on a touch-panel displays becomes excessively large (for example, specific operation keys are displayed in '330 Reference), or the number of transitions between images increases, possibly impairing operability.

In view of the foregoing, it may be possible to set and customize for each user in advance, which of the external keyboard described in '330 Reference and the software button displayed to allow selection on the touch-panel display is to be used with priority. It is troublesome, however, to call a setting image necessary for such customization and to conduct the setting operation.

Since touch-panel displays come to have larger size, it becomes more common to realize conventional hardware buttons by the touch-panel display. Such an approach is advantageous in that the manner of display (positions, colors and shapes of buttons) can be controlled by software. For a user who values the sense of touch at the time of operation or for a user who values visibility (that the same button is always positioned at the same position), software buttons are difficult to operate. Some users may wish to operate only by hardware buttons, while others may wish to operate only by software buttons. In this way, the image forming apparatus and the like are shared by a large number of users having different preferences for operation. It is troublesome in such circumstances to call a setting image for customization of operation method and to conduct the setting operation to meet the preferences in operation of the users.

Further, as described above, the number of touch-panel displays allowing gesture operations is increasing. Such displays are advantageous in that an operation image can be simplified, since menu selection becomes unnecessary and the control items such as buttons arranged on the image can be reduced. For a user not accustomed to the gesture operation method, however, it may be difficult to find an operation method to realize a requested function. Such gesture operations may not always be possible by a physically handicapped user. Considering such situations, it is desirable to provide the conventional menu type operation method that does not involve any gesture operation. If the gesture operation method and the conventional menu type operation method are both employed, however, the number of components on an image increases, possibly impairing user convenience. In order to avoid such a problem, it is possible to call a setting image necessary for customizing the operation method and to conduct the setting operation. Setting, however, is troublesome.

SUMMARY OF THE INVENTION

In view of the problems described above, it is desirable to provide, in electronic equipment and image processing apparatuses (image forming apparatuses) in which a plurality of operation devices (for example, hardware buttons and software buttons on a touch-panel display) are provided, an operation console that enables easy customization to prevent one operation device from interfering with another, without necessitating special setting by the user. Further, it is desirable to provide, in electronic equipment and image processing apparatuses (image forming apparatuses) in which a plurality of operation methods (menu operation (non-gesture operation) and gesture operation) are provided for one command, an operation console that enables easy customization to give priority to the operation method requested by the user, without necessitating special setting by the user.

According to an aspect, the present invention provides an operation console provided on an apparatus as an object of control. The operation console includes: a first operation unit allowing a user to input a request to the apparatus as the object of control; a second operation unit operated by the user in a manner exclusive to the first operation unit, allowing the user to input a request to the apparatus as the object of control; a determining unit detecting an operation of the first operation unit and the second operation unit by the user, for determining which of the first operation unit and the second operation unit is to be given priority; a display unit displaying information to the user; and a control unit controlling the display unit such that a piece of information assisting the user to recognize the first operation unit or the second operation unit that is determined to be given priority is displayed.

In the operation console, if at least two operation units operated in an exclusive manner are provided and the user operates one operation unit, determination is made to give priority to the operation unit that is operated. By the simple fact of determination, the user cannot recognize which of the operation units is given priority and hence, the user may use an operation unit not given priority. Here, however, a piece of information is displayed on the display unit allowing the user to recognize the operation unit that is determined to have priority. Therefore, the user will not operate the operation unit that is determined not to have priority. As a result, when a plurality of operation units are provided, an operation unit to have priority is determined, so as to prevent one operation unit from interfering with another. Further, the user can recognize which of the operation units is the one with priority. In this manner, customization takes place automatically, and the user can operate the operation unit that is determined to have priority. For the user, priority is given to the operation unit operated by himself/herself and the operation unit continuously keeps the priority. Therefore, an operation unit matching the user's preference of operation is automatically given priority and notified, without necessitating any special setting.

Preferably, the determining unit of the operation console determines which of the first operation unit and the second operation unit is to be given priority based on presence/absence of a signal input from the first operation unit by a user operation and a signal input from the second operation unit by a user operation. Here, the determining unit may determine to give priority to the first operation unit when a signal that can be input only from the first operation unit is detected, or may determine to give priority to the second operation unit when a signal that can be input only from the second operation unit is detected.

It is possible to determine which of the operation units should be given priority, based on the signal detected at the input interface provided between the operation units (devices) and the determining unit (processor unit). Assuming that the first operation unit is a hardware keyboard and the second operation unit is a software keyboard displayed on the touch-panel display, it can easily be determined which of the operation units is to be given priority, by detecting an operation of a specific key that is provided on only one of the keyboards.

More preferably, the first operation unit is implemented by a software button displayed on a touch-panel display, and the second operation unit is implemented by a hardware button. The display unit may include the touch-panel display and a pilot lamp provided for the hardware button.

When the touch-panel display is operated with priority, software buttons are displayed on the touch-panel display, and when the hardware buttons are operated with priority, the pilot lamp is turned on, so that the operation unit having priority can be recognized by the user. Thus, erroneous operation by the user of the operation unit not having priority can be avoided.

More preferably, the control unit of the operation console controls the display unit such that, when it is determined to give priority to the second operation unit, the pilot lamp is lit or flickered and the software button is erased from the touch panel display. Here, the operation consol may resume display of the software button that has been erased from the touch-panel display.

If a hardware button is operated and priority is given to the hardware buttons, the pilot lamp is lit or flickered, and the software buttons are erased from the touch-panel display. Therefore, erroneous operation by the user of the operation unit not having priority can be avoided. Further, the software buttons once erased from the touch-panel display can be displayed again, to follow the change in user's preference in operation. That the buttons are displayed again means the operation by the software buttons is possible.

Preferably, the control unit of the operation console controls the display unit such that, when it is determined to give priority to the first operation unit, the pilot lamp is turned off and the software button is displayed on the touch-panel display. Here, the operation console may light again or flicker again the pilot lamp that has been turned off.

If a software button is operated and priority is given to the software button, the pilot lamp is turned off and the software buttons are displayed on the touch-panel display. Therefore, erroneous operation by the user of the operation unit not having priority can be avoided. Further, the pilot lamp once turned off can be lit or flickered again, to follow the change in user's preference in operation. That the pilot lamp is lit or flickered again means the operation by the hardware buttons is possible.

More preferably, the operation console is configured to further include a user identification unit identifying a user; and a storage unit storing, user by user, operation history of the user of the first operation unit and the second operation unit. Here, the determining unit may determine which of the first operation unit and the second operation unit is to be given priority for the identified user, based on the operation history. Further, the determining unit may determine which of the first operation unit and the second operation unit is to be given priority, if the operation history can be determined to reflect operation preference of the user.

The operation unit to be given priority is determined not based on one operation by the user but based on the history of which operation unit is operated with what frequency. Therefore, user's preference of operation can reliably be determined. If the determination of operation unit is made only in such situations that the operation history reflects the user's preference in operation, for example, when the number of samples is a predetermined number or more, or when the frequency of selection of a specific operation unit is a predetermined frequency or higher, the user's preference in operation can more correctly be determined.

According to another aspect, the present invention provides an operation console provided on an apparatus as an object of control, including: a touch-panel display; a display control unit controlling the touch-panel display such that information to be notified to the user is displayed; and an input control unit controlling the touch-panel display such that a request to the apparatus as the object of control is detected in response to a user touching the touch-panel display. The input control unit includes: a first input control unit detecting the request based on a position where the user touched the touch-panel display; and a second input control unit detecting the request based on a trajectory of the user touching the touch-panel display. The display control unit displays a first information item corresponding to the first input control unit on the touch-panel display, displays a second information item corresponding to the second input control unit on the touch-panel display, and changes a manner of display of the first information item if a user request is detected by the second input control unit.

If a requesting operation (the gesture operation described above) is detected based on the trajectory of user's touching a portion of the touch-panel display where the second information item (for example, an object to be displayed in enlarged size) is displayed, it is possible to determine that the gesture operation is preferred. Then, the operation of simply touching the touch-panel display without any gesture operation (non-gesture operation) is determined not to match the user's preference in operation, and the manner of displaying the first information item (for example, zoom menu button) corresponding to the non-gesture operation is changed to be less noticeable to the user. In this manner, the image on the touch-panel display following the user's preference in operation can easily be realized.

Preferably, the display control unit changes the manner of display of the first information item such that priority is given to the second information item. Here, the display control unit may change the manner of display of the first information item corresponding to the detected user request by the second input control unit such that the order of display of the first information item becomes lower. Further, the display control unit may erase display of the first information item. Further, the display control unit may reduce an area for displaying the first information item.

The first information item corresponding to the non-gesture operation can be changed to be less noticeable to the user, by lowering the rank order of display of the first information item, erasing the first information item, or reducing the size of the first information item. Thus, the image can be customized to reflect the user's preference in operation.

According to a still another aspect, the present invention provides electronic equipment including the operation console described above. According to a still further aspect, the present invention provides an image processing apparatus including the operation console described above.

In the electronic equipment and the image processing apparatus, even when a plurality of operation devices are provided and each user has different preference of operation, easy customization to prevent one operation device from interfering with another is possible without necessitating special setting by the user. Further, even when a plurality of operation methods (gesture operation and non-gesture operation) are provided and each user has different preference of operation, easy customization to give priority to the operation method requested by the user is possible without necessitating special setting by the user. Such a function is particularly effective in the electronic equipment or image processing apparatus (image forming apparatus) shared by a large number of users.

According to a still another aspect, the present invention provides an operation method of an operation console provided on an apparatus as an object of control. The operation console includes a display unit, a processor unit and a plurality of operation units. The operation method includes: the first operation step of receiving a request by a user to the apparatus as the object of control using a first operation unit; the second operation step of receiving, in a manner exclusive to the first operation step, a request by the user to the apparatus as the object of control, using a second operation unit different from the first operation unit; the determining step of detecting the user operation at the first operation step and the second operation step, and determining, using the processor unit, which of the first operation unit and the second operation unit is to be given priority; and the display step of displaying information to the user using the display unit. At the display step, a piece of information assisting the user to recognize the operation unit that is determined to be given priority is displayed.

Even when a plurality of operation units are provided and each user has different preference of operation, easy customization to prevent one operation unit or an operation step by the operation unit from interfering with another operation unit or its operation step is possible without necessitating special setting by the user. Further, it is possible for the user to recognize the operation unit that is determined to have priority. Therefore, confusion caused by erroneous operation of an operation unit not having priority can be prevented.

According to a still further aspect, the present invention provides an operation method of an operation console including a touch-panel display and a processor unit. The operation method includes: the display control step of controlling the touch-panel display such that information to be notified to the user is displayed, using the processor unit; and the input control step of controlling the touch-panel display such that a request to the apparatus as the object of control is detected in response to a user touching the touch-panel display. The input control step includes: the first input control step of detecting the request based on a position where the user touched the touch-panel display; and a second input control step of detecting the request based on a trajectory of the user touching the touch-panel display. The display control step includes: the step of displaying a first information item corresponding to the first input control step; the step of displaying a second information item corresponding to the second input control step; and the changing step of changing a manner of display of the first information item if a user request is detected at the second input control step.

Even when a plurality of operations (gesture operation and non-gesture operation) are provided and each user has different preference of operation, easy customization to give priority to the operation requested by the user is possible without necessitating special setting by the user.

According to the present invention, in the electronic equipment including an image processing apparatus (image forming apparatus), when a plurality of operation devices are provided for one command, easy customization to prevent one operation device from interfering with another is possible without necessitating special setting by the user. Further, in the electronic equipment and the image processing apparatus (image forming apparatus) in which a plurality of operation methods are provided for one command, easy customization to give priority to the operation method requested by the user is possible without necessitating special setting by the user.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows a data structure of a user management table stored in a hard disk drive (HDD) of FIG. 3.

DESCRIPTION OF THE PREFERRED EMBODIMENTS

Figure 1:
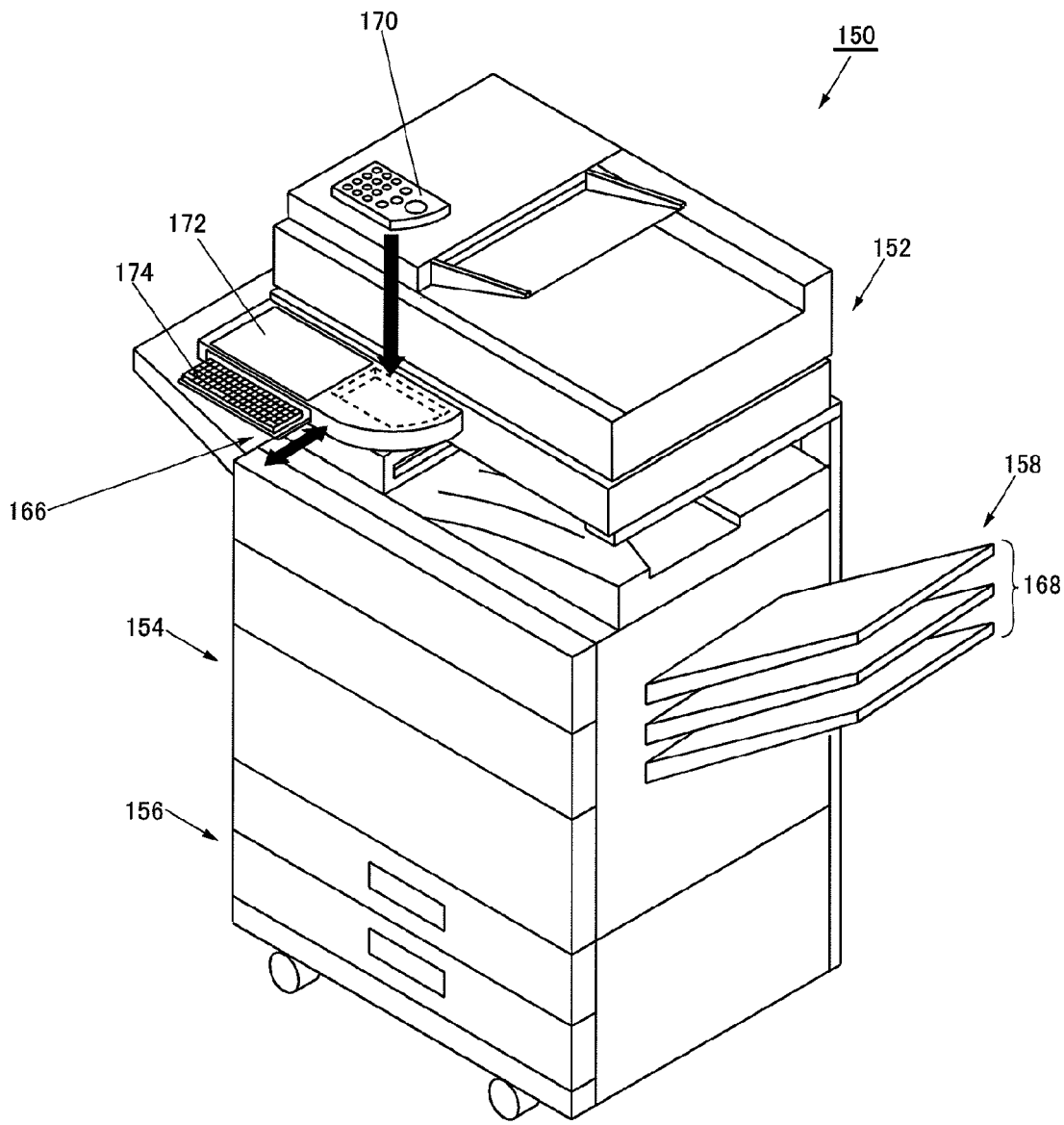
FIG. 1 is a perspective view showing an appearance of the image forming apparatus in accordance with a first embodiment of the present invention.

In the following description, the same components are denoted by the same reference characters. Their names and functions are also the same. Therefore, detailed description thereof will not be repeated.

<First Embodiment>

The electronic equipment in accordance with the first embodiment of the present invention is an image forming apparatus as one type of image processing apparatuses. The operation console in accordance with the present invention may be applicable to an image processing apparatus or electronic equipment other than the image forming apparatus. The electronic equipment in accordance with the present embodiment may be any device provided that a plurality of operation devices (for example, hardware buttons and software buttons realized by a touch-panel display) are provided for one command and that it allows easy customization to prevent one operation device from interfering with another without necessitating special setting by the user. In this regard, the electronic equipment in accordance with the present invention always has a touch-panel display provided as an operation device.

The image forming apparatus forms an image on a sheet of recording paper by electro-photography. The image forming apparatus includes copy mode, FAX mode (the display on the display panel is "FAX/IMAGE TRANSMISSION") and scanner mode (the display on the display panel is "DOCUMENT FILING"). The image forming apparatus may further include a network printer mode. The present invention, however, is not limited to the above, and the image forming apparatus having one or more of the copy mode, FAX mode and scanner mode may be used. Further, the printing method is not limited to electro-photography.

[Image Forming Apparatus: Function]

Figure 2:
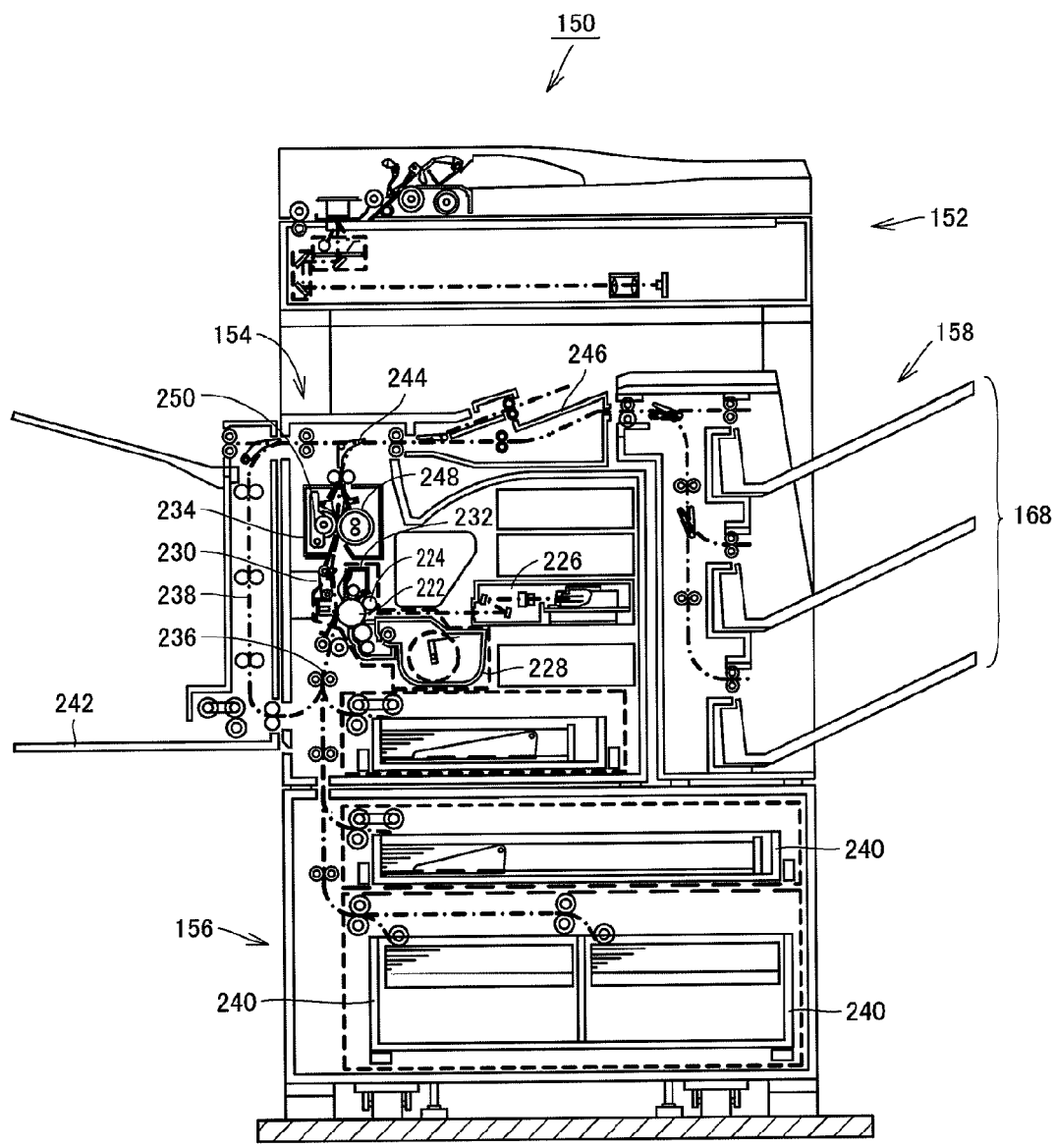
FIG. 2 schematically shows an internal configuration of the image forming apparatus shown in FIG. 1.
Figure 3:
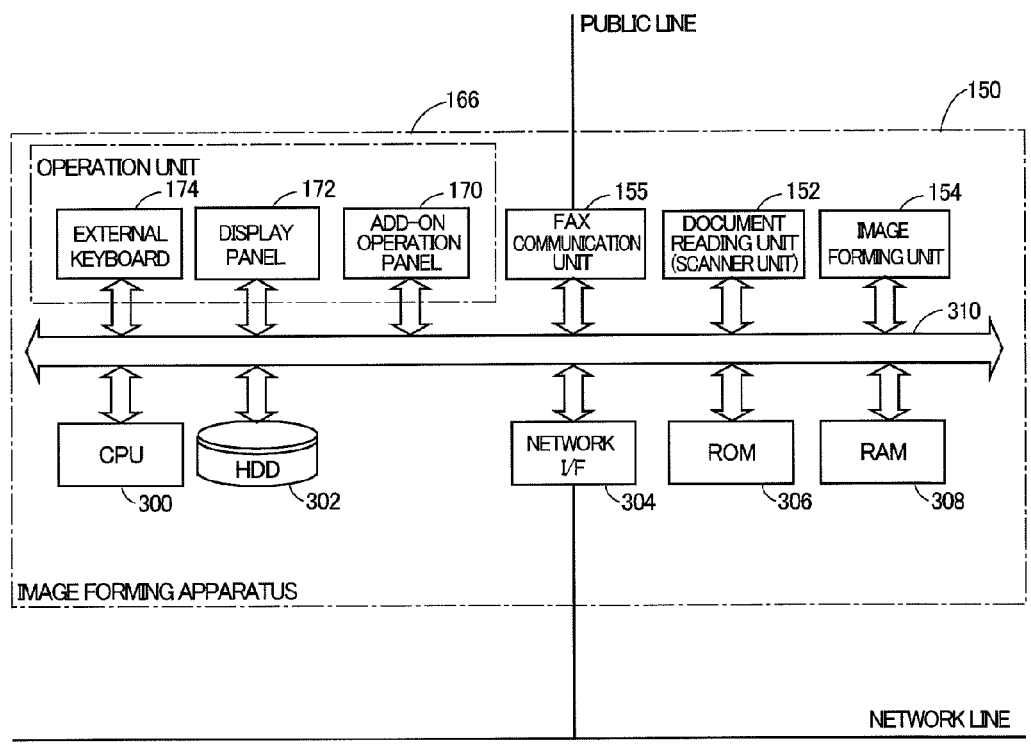
FIG. 3 is a functional block diagram showing a hardware configuration of the image forming apparatus shown in FIG. 1.

Referring to FIGS. 1 to 3, an image forming apparatus 150 in accordance with the embodiment of the present invention will be described.

Referring to FIGS. 1 and 2, image forming apparatus 150 includes a document reading unit 152, an image forming unit 154, a paper feed unit 156, a paper discharge unit 158 and an operation unit 166. Operation unit 166 includes a display panel 172, an add-on operation panel 170 (in the following, also simply referred to as operation panel 170), and an external keyboard 174 (in the following, also simply referred to as keyboard 174). Display panel 172 is implemented by a touch-panel display. Operation panel 170 is detachable to the operation unit, and it includes a plurality of hardware buttons. Keyboard 174 is retractable.

Though not limiting, display panel 172 is a basic component of image forming apparatus 150, while add-on operation panel 170 and external keyboard 174 are optional components of image forming apparatus 150. When optional components are not provided, operation unit 166 only has display panel 172 implemented by a touch-panel display. In that case, a recess formed on a top surface of operation unit 166 to receive add-on operation panel 170 to be fitted therein is closed by a lid.

As described above, image forming apparatus 150 in accordance with the present embodiment includes display panel 172 as the first operation device, external keyboard 174 as the second operation device, and add-on operation panel 170 as the third operation device. In contrast to display panel 172 (software buttons implemented by touch-panel display), external keyboard 174 and add-on operation panel 170 function as hardware buttons. Image forming apparatus 150 is not limited to one having both external keyboard 174 and add-on operation panel 170, and it may include only one of these operation devices. Further, the operation device with hardware buttons is not limited to external keyboard 174 and add-on operation panel 170.

—Copy Mode—

In the following, an operation in the copy mode will be described. In the copy mode, mainly document reading unit (also referred to as a scanner unit) 152 and image forming unit 154 operate to realize the copy function.

In image forming apparatus 150, a document placed on a platen is read by document reading unit 152 as image data. The read image data is input to CPU (Central Processing Unit) 300 implemented, for example, by a microcomputer shown in FIG. 3. The image data is subjected to various image processing operations here, and the resulting image data is output to image forming unit 154.

Image forming unit 154 is for printing an image of the document represented by the image data on a recording medium (in most cases, on a sheet of recording paper). Image forming unit 154 includes a photoreceptor drum 222, a charger 224, a laser scanning unit (hereinafter denoted as LSU) 226, a developer 228, a transfer device 230, a cleaning device 232, a fixing device 234 and a neutralizer, not shown.

In image forming unit 154, a main feeding path 236 and a reverse feeding path 238 are provided, and a sheet of recording paper fed from paper feed unit 156 is fed along main feeding path 236. Paper feed unit 156 draws out sheets of recording paper stacked on a paper feed cassette 240 or on a manual feed tray 242 one by one, and feeds the sheet of paper to main feeding path 236 of image forming unit 154.

While the sheet of recording paper is fed along main feeding path 236 of image forming unit 154, the sheet passes between photoreceptor drum 222 and transfer device 230, and further passes through fixing device 234, whereby printing is done on the sheet of recording paper.

Photoreceptor drum 222 rotates in one direction, and its surface is cleaned by cleaning device 232 and the neutralizer and, thereafter, uniformly charged by charger 224.

LSU 226 modulates the laser beam based on the image data to be printed, and repeatedly scans the surface of photoreceptor drum 222 with the modulated laser beam in a main scanning direction, whereby an electrostatic latent image is formed on the surface of photoreceptor drum 222.

Developer 228 develops the electrostatic latent image by supplying toner to the surface of photoreceptor drum 222, and thus, a toner image is formed on the surface of photoreceptor drum 222.

Transfer device 230 transfers the toner image on the surface of photoreceptor drum 222 to the sheet of recording paper passing between transfer device 230 and the photoreceptor drum 222.

Fixing device 234 includes a heating roller 248 and a pressure roller 250. Heating roller 248 is for heating the sheet of recording paper. Pressure roller 250 is for pressing the sheet of recording paper. As the sheet of recording paper is heated by heating roller 248 and pressed by pressure roller 250, the toner image that has been transferred to the sheet of recording paper is fixed on the sheet. A heater is heated by electric power supplied to fixing device 234 and controlled such that temperature of heating roller 248 attains to an appropriate temperature for fixing.

At a position of connection between main feeding path 236 and reverse feeding path 238, a separation pawl 244 is arranged. When printing is done only on one side of the sheet of recording paper, separation pawl 244 is so positioned that the sheet of recording paper fed from fixing device 234 is guided to paper discharge tray 246 or a paper discharge unit 158.

When printing is done on both sides of the sheet of recording paper, separation pawl 244 is turned to a prescribed direction, so that the sheet of recording paper is guided to reverse feeding path 238. The sheet of recording paper passes through reverse feeding path 238, turned upside-down and again fed to main feeding path 236, and while it is again fed along main feeding path 236, printing is done on its rear surface, and thereafter the sheet is guided to paper discharge tray 246 or to paper discharge unit 158.

The sheet of recording paper printed in the above-described manner is guided to paper discharge tray 246 or to paper discharge unit 158, and discharged to paper discharge tray 246 or to any of paper discharge trays 168 of paper discharge unit 158.

Paper discharge unit 158 may perform a process of sorting a plurality of printed sheets of paper to be output to different discharge trays 168, a process of punching each sheet of recording paper or a process of stapling the sheets of recording paper. Assume that a number of copies of the printing are to be prepared. In that case, sheets of recording paper are sorted and discharged to paper discharge trays 168 such that each tray 168 contains each set of printed sheets, and the set of printed sheets in each tray 168 is stapled or punched, whereby copies of prints are prepared.

—Facsimile Mode—

In the following, an operation in the facsimile mode will be described. In the facsimile mode, the facsimile function is realized by transmission and reception operations. In the transmission operation, document reading unit (scanner unit) 152 and FAX communication unit 155 mainly operate. In the reception operation, FAX communication unit 155 and image forming unit 154 mainly operate.

Transmission Operation

In image forming apparatus 150, the facsimile mode is designated.

A document placed on the platen is read by document reading unit 152 as image data. The read image data is input to CPU 300 implemented, for example, by a microcomputer shown in FIG. 3, the image data is subjected to various image processing operations here, and the resulting image data is output to a FAX communication unit (FAX communication unit 155 of FIG. 3).

FAX communication unit 155 of image forming apparatus 150 on the transmitting side connects a designated transmitting side line to a designated transmission destination. FAX communication unit 155 converts the image data to communication data in compliance with facsimile transmission standard, and transmits the converted data to a facsimile machine (such as an image forming apparatus having the facsimile function) on the receiving side.

Communication Operation

When the line is connected, a FAX communication unit of the image forming apparatus on the receiving side detects a communication request signal from FAX communication unit 155 of image forming apparatus 150 on the transmitting side, and transmits an acknowledgement signal. Thereafter, by way of example, FAX communication units on the transmitting and receiving sides pass performance information supported by transmitting side and receiving side, determine highest possible speed of communication and method of coding/code correction of image data, and set the method of communication of modems. Then, using the image signal format in compliance with the communication method, data is transmitted from FAX communication unit 155 of image forming apparatus 150 on the transmitting side to the FAX communication unit of image forming apparatus on the receiving side. When transmission ends, the line is disconnected.

Reception Operation

The FAX communication unit of the image forming apparatus on the receiving side converts the received data to image data and passes the data to an image forming unit. The received data may be converted to image data at the image forming unit. The image forming unit prints an image of a document represented by the image data converted from the received data on a sheet of recording paper, in a manner similar to the operation in the copy mode described above.

—Scanner Mode—

In the following, an operation in the scanner mode will be described. In the scanner mode, mainly by the operation of document reading unit (scanner unit) 152, the scanner function is realized.

In image forming apparatus 150, a document placed on the platen is read by document reading unit 152 as image data. The read image data is input to CPU 300. The image data is subjected to various image processing operations here, and the resulting image data is stored in a storage device or transmitted to a computer connected to the network through a network interface.

[Image Forming Apparatus: Control Block Configuration]

Referring to FIG. 3, image forming apparatus 150 further includes operation unit 166, ROM (Read Only Memory) 306, a hard disk drive (hereinafter denoted as HDD) 302, and an RAM (Random Access Memory) 308. Operation unit 166 allows setting of functions related to the copy mode, facsimile mode and scanner mode. ROM 306 stores programs and the like. HDD 302 is a non-volatile storage area capable of storing programs and data even when power is cut off. RAM 308 provides a storage area when a program is executed.

Image forming apparatus 150 further includes a bus 310 and CPU 300. Document reading unit 152, image forming unit 154, FAX communication unit 155, operation unit 166, ROM 306, HDD 302, RAM 308, and a CPU 300 are connected to bus 310. CPU 300 realizes general functions as the image forming apparatus.

ROM 306 stores programs and data necessary for controlling operations of image forming apparatus 150. CPU 300 controls image forming apparatus 150 in accordance with the programs and data stored in ROM 306, and executes control related to various functions of image forming apparatus 150. In order to manage operation devices for the users using image forming apparatus 150, a user management table is stored in HDD 302. Details of the user management table will be described later.

As shown in FIG. 3, a public line is connected for transmitting/receiving image data, to FAX communication unit 155 of image forming apparatus 150. To network interface 304, a network line is connected. To the network line, a computer or the like using image forming apparatus 150 as a network-supported printer may be connected. To the network line, a computer or the like identified by a URL (Uniform Resource Locator) designated through the Internet may be connected. When connected to the Internet, image forming apparatus 150 can obtain necessary information through the Internet.

RAM 308 provides a function of a working memory for temporarily storing results of operations and processes by CPU 300, and a function of a frame memory for storing image data.

CPU 300 controls document reading unit 152, image forming unit 154, ROM 306, HDD 302, RAM 308 and operation panel 170, display panel 172 and keyboard 174 forming operation unit 166, by executing a prescribed program or programs. Operation unit 166 communicates with CPU 300 through an input/output interface.

Operation unit 166 includes operation panel 170, display panel 172 and external keyboard 174. Operation panel 170 is provided with hardware buttons, including ten-keys and various other operation buttons (start key, stop key, clear key, reset key and the like) arranged on a right area on the surface of operation unit 166. Operation panel 170 has a flat, plate shape. Display panel 172 is arranged on the central to the left side of operation unit 166, and it includes a touch-panel display. External keyboard 174 can be drawn out to the front side of display panel 172. Operation panel 170 can be detachably attached to operation unit 166. Keyboard 174 can be drawn out from below display panel 172. Keyboard 174 can be drawn in/out by the user. On the contrary, operation panel 170 is mounted on operation unit 166 by an administrator (or maintenance personnel, manufacturer or the like). Mounted operation panel 170 is held in one housing with display panel 172. The user cannot freely attach/detach operation panel 170. Display panel 172, operation panel 170 and keyboard 174 form operation unit 166 as one integrated body as a whole.

In operation unit 166, menu of each mode of image forming apparatus 150, current state of image forming apparatus 150, status of destination designation, and status of job processing are displayed on display panel 172. On a display area of display panel 172, selection buttons as software buttons are displayed. When a portion where the selection button is displayed is pressed, the pressed position is detected by the touch panel. By comparing the display position of the selection button and the position where the touch panel is pressed using a program, setting of a function and instruction of an operation of image forming apparatus 150 becomes possible. In addition to such a method of operation in the form of a menu, image forming apparatus 150 also allows a method of operation using gestures (command input based on trajectory of operation by the user) as described above.

On external keyboard 174, a keyboard lamp, which is turned on/off (or flickered) under the control of CPU 300, is provided. The keyboard lamp is turned on when hardware buttons are set to be used as the operation device. When keyboard 174 is operated while the keyboard lamp is off, the keyboard lamp is turned on.

Further, in a hardware button of add-on operation panel 170, a key lamp, which is turned on/off (or flickered) under the control of CPU 300, is embedded. By way of example, the key lamp provides a light ring around a circular start key, or lights a light emitting portion at the center of the start key. The key lamp is turned on when hardware buttons are set to be used as the operation device.

In the following, the keyboard and key lamps will be generally referred to as a hardware button lamp. The hardware button lamp is lit or flickered to notify the user that the operation device set to be used is the hardware buttons, effectively attracting user's attention to the hardware buttons.

[User Management Table]

Image forming apparatus 150 in accordance with the present embodiment includes a plurality of operation devices (software buttons realized by display panel 172 and hardware buttons provided on operation panel 170 and keyboard 174) for one command. With such a plurality of operation devices, customization is done to prevent one operation device from interfering with another, without necessitating any special setting by the user. Such a process is realized by software executed by the hardware configuration described above. The user management table used by the software will be described.

As shown in FIG. 4, the user management table includes a field for storing the number of use of a software button at the time of log-in (when log-in procedure is executed), a field for storing the number of use of a hardware button at the time of log-in, and a field for storing the operation device determined to be used, with a user name of the user of image forming apparatus 150 used as a key. Further, the user management table may store, user by user, the number of samples, a ratio S and a ratio H, calculated by a program which will be described later. The number of samples is calculated as the number of use of the software button at the time of log-in+the number of use of the hardware button at the time of log-in. The ratio S represents the ratio of each user using the software button. The ratio S is calculated as the number of use of software button at the time of log-in/the number of samples. The ratio H represents the ratio of each user using the hardware button. The ratio H is calculated as the number of use of hardware button at the time of log-in/the number of samples. As will be described later, the number of samples and the ratios S and H are calculated and stored at appropriate time interval (for example, time interval of 24 hours).

In the field for storing the number of use of a software button or a hardware button at the time of log-in, the number of use in the past six months, for example, is stored. In the field for storing the determined operation device, the type of the operation device used by the user is stored if, for example, the number of samples is ten or more. Here, if the ratio S is 80% or higher, "software buttons" is stored as the operation device used by the user. If the ratio H is 80% or higher, "hardware buttons" is stored as the operation device used by the user. If the number of samples is smaller than 10, if the ratio S is lower than 80% or if the ratio H is lower than 80%, the operation device used by the user is not determined and, hence, not stored.

If it is set in image forming apparatus 150 that the operation device to be used by a logged-in user is selected in accordance with the use history (for example, if an operation device setting flag is set as system setting), then, based on the operation device stored in the user management table for the specified logged-in user, the corresponding operation device (software buttons or hardware buttons) is made effective or displayed with priority.

In this manner, image forming apparatus 150 executes the customizing process to prevent one operation device from interfering with another, without necessitating any special setting by the user. Such a process is realized by the hardware configuration described above and the software executed using the user management table. In the following, the software configuration will be described.

[Software Configuration]

Figure 5:
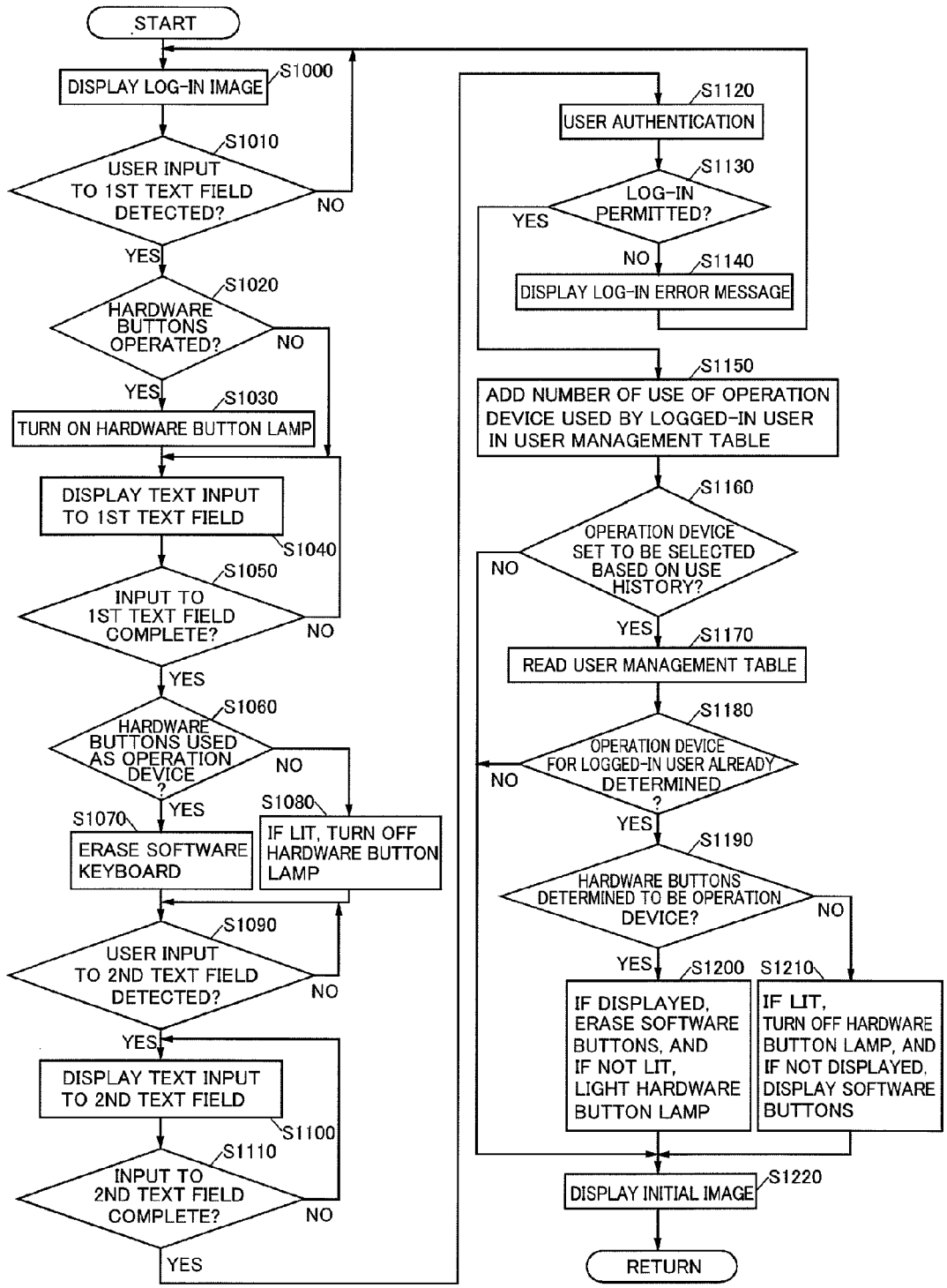
FIG. 5 is a flowchart representing a control structure of a program executed by the image forming apparatus in accordance with the first embodiment of the present invention.
Figure 6:
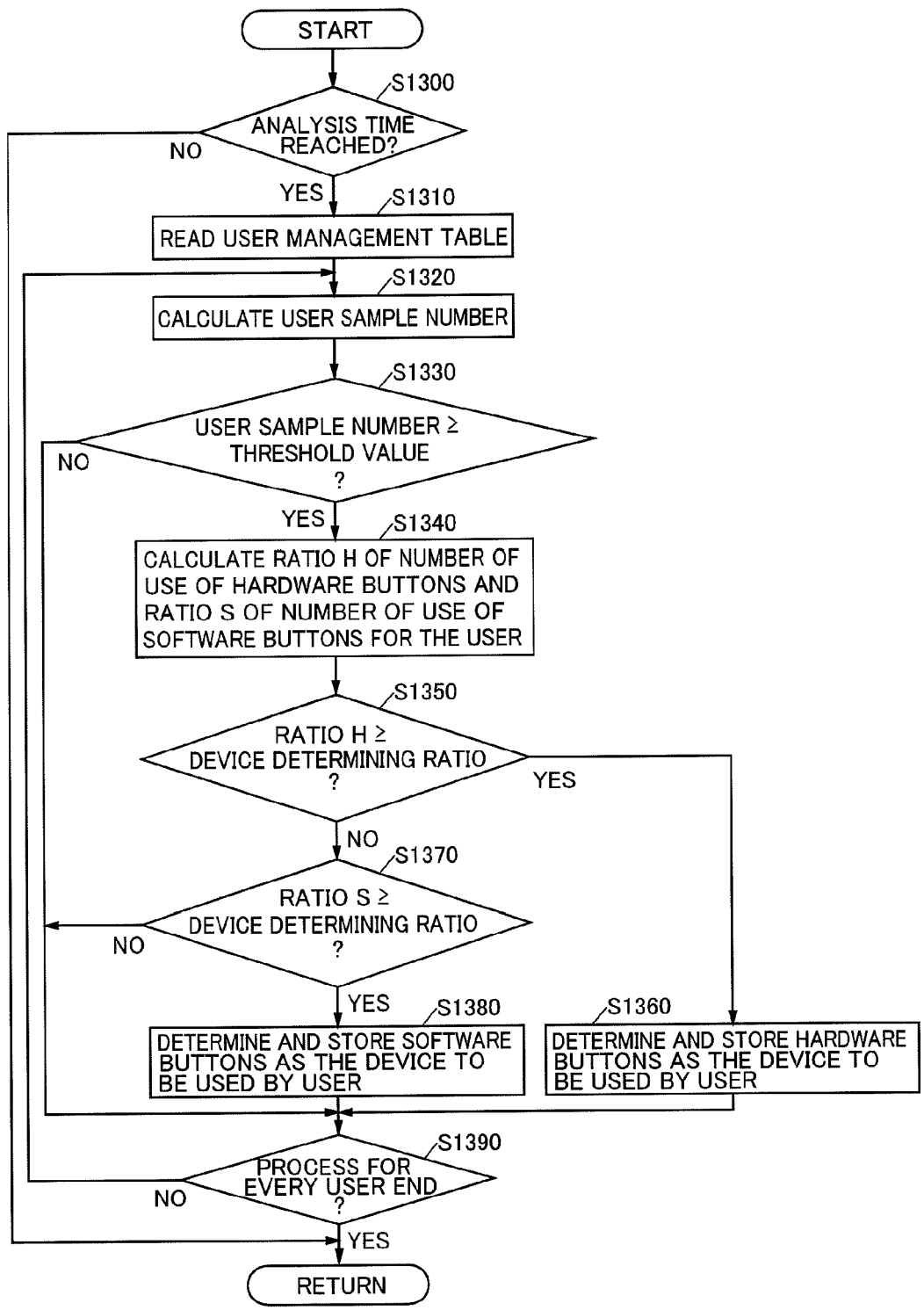
FIG. 6 is a flowchart representing a control structure of another program executed by the image forming apparatus in accordance with the first embodiment of the present invention.

CPU 300 of image forming apparatus 150 executes, in parallel with the program shown in FIGS. 5 and 6, a program for realizing general functions of an image forming apparatus having a plurality of functions. The program, however, is not directly related to the characteristic portion of the present invention and, therefore, details thereof will not be described here.

Referring to FIG. 5, at step (hereinafter "step" will be denoted as "S") 1000, CPU 300 of image forming apparatus 150 (hereinafter simply referred to as CPU 300) displays a log-in image on display panel 172. Here, CPU 300 displays a first text field, a second text field and a software keyboard on display panel 172. The first text field is to input a log-in name, for user authentication. The second text field is to input a password. At this time, external keyboard 174 may be drawn out and used.

At S1010, CPU 300 determines whether or not an input to the first text field by the user is detected. Here, CPU 300 determines whether or not the user input is detected, based on data input through the software keyboard displayed on display panel 172 or data input through external keyboard 174. If it is determined that the input to the first text field by the user is detected (YES at S1010), the process proceeds to S1020. Otherwise (NO at S1010), the process returns to S1000, and the process is repeated until it is determined that the user input to the first text field is detected.

At S1020, CPU 300 determines whether or not a hardware button is operated by the user. Here, CPU 300 determines that a hardware button is operated by the user if data input through external keyboard 174 is detected. If it is determined that a hardware button is operated by the user (YES at S1020), the process proceeds to S1030. Otherwise (NO at S1020), the process proceeds to S1040.

At S1030, CPU 300 turns on the hardware button lamp. The hardware button lamp includes a keyboard lamp and a key lamp. At this time, CPU 300 turns on at least the keyboard lamp.

At S1040, CPU 300 displays the text input by the user, in the first text field of display panel 172.

At S1050, CPU 300 determines whether or not the input to the first text field by the user is completed. Here, CPU 300 determines that the input to the first text field by the user is completed, if CPU 300 detects that the user moved an input cursor to the second text field. If it is determined that the input to the first text field by the user is completed (YES at S1050), the process proceeds to S1060. Otherwise (NO at S1050), the process returns to S1040, and the display of user input to the first text field is executed.

At S1060, CPU 300 determines whether or not the operation device used for the input to the first text field by the user was the hardware buttons. If it is determined that the operation device was the hardware buttons (YES at S1060), the process proceeds to S1070. Otherwise (NO at S1060), the process proceeds to S1080.

Here, at S1060, CPU 300 determines that the operation device used was the hardware buttons, by detecting an input signal from external keyboard 174. CPU 300 determines that the operation device was not the hardware buttons (but software buttons), by detecting an input signal from the software keyboard. That the operation device was the hardware buttons may be determined when an input signal from a key button existing only among the hardware buttons and not the software buttons (for example, "TAB" key) is detected. Alternatively, that the operation device was the software buttons may be determined when an input signal from a key button existing only among the software buttons and not the hardware buttons is detected.

At S1070, CPU 300 erases the software keyboard that has been displayed on display panel 172. Thereafter, the process proceeds to S1090. At S1080, CPU 300 turns off the hardware button lamp if the lamp has been lit. The process of S1080 is executed when, for instance, the user once tried to input through external keyboard 174 and the keyboard lamp was once turned on at S1030 and thereafter, the user eventually made inputs to the first text field using the software keyboard.

At S1090, CPU 300 determines whether or not an input to the second text field by the user is detected. Here, CPU 300 determines whether or not the user input is detected, based on data input through the software keyboard displayed on display panel 172 (if it is NO at S1060), or data input through external keyboard 174 (if it is YES at S1060). If it is determined that the input to the second text field by the user is detected (YES at S1090), the process proceeds to S1100. Otherwise (NO at S1090), the process returns to S1100, and the process is repeated until it is determined that input to the second field by the user is detected.

At S1100, CPU 300 displays the text input by the user in the second text field of display panel 172.

At S1110, CPU 300 determines whether or not input to the second text field by the user is completed. Here, CPU 300 determines that the input to the second text field by the user is completed, if CPU 300 detects that the user selected an ENTER button or an OK button. If it is determined that the input to the second text field by the user is completed (YES at S1110), the process proceeds to S1120. Otherwise (NO at S1110), the process returns to S1100, and the display of user input in the second text field is executed.

At S1120, CPU 300 executes user authentication. Here, CPU 300 transmits the log-in name and the password input by the user to an authentication server through the network line, and receives a user authentication signal (log-in permission signal/log-in rejection signal). User authentication may be executed not by an authentication server but by image forming apparatus 150 or other apparatus.

At S1130, CPU 300 determines whether or not log-in is permitted. If it is determined that log-in is permitted (YES at S1130), the process proceeds to S1150. Otherwise (NO at S1130), the process proceeds to S1140.

At S1140, CPU 300 displays a log-in error message on display panel 172. If a predetermined time passes or a buttons such as "RETURN" is pressed, the process returns to S1000, and the log-in image for user authentication is displayed on display panel 172.

At S1150, CPU 300 adds the number of use of the used operation device for the user who is authorized to log-in by user authentication, to the corresponding number of use in the user management table shown in FIG. 4. Here, the used operation device is the operation device determined by the process at S1060.

At S1160, CPU 300 determines whether or not image forming apparatus 150 is set to select the operation device in accordance with the use history of the user. Here, CPU 300 makes the determination based on the operation device setting flag stored in HDD 302 as the system setting by the administrator. If image forming apparatus 150 is set to select the operation device in accordance with the use history of the user (YES at S1160), the process proceeds to S1170. Otherwise (NO at S1160), the process proceeds to S1220. If the apparatus is not set to select the operation device in accordance with the use history of the user (NO at S1160), the operation device used when inputting the log-in name to the first text field is the operation device to be used by the logged-in user.

At S1170, CPU 300 reads the user management table from HDD 302. The user management table may be read from HDD 302 and stored in RAM 308 when image forming apparatus 150 is powered on.

At S1180, CPU 300 looks up the user management table, and determines whether or not the operation device for the logged-in user has already been determined (not pending). If the operation device for the logged-in user has already been determined (not pending) (YES at S1180), the process proceeds to S1190. Otherwise (NO at S1180), the process proceeds to S1220. If the apparatus is set to select the operation device in accordance with the use history of the user and the operation device is still not determined (pending) as described above (NO at S1180), the operation device used when inputting the log-in name in the first text field will be the operation device to be used by the logged-in user.

At S1190, CPU 300 determines whether or not the determined operation device for the user is hardware buttons. If it is determined that the operation device determined for the logged-in user is the hardware buttons (YES at S1190), the process proceeds to S1200. Otherwise (NO at S1190), the process proceeds to S1210.

At S1200, if software buttons (software keyboard and software buttons) are displayed on display panel 172, CPU 300 erases the software buttons. Further, if the hardware button lamp (keyboard lamp and key lamp) is off, CPU 300 turns on the hardware button lamp. Then, the process proceeds to S1220.

At S1210, if the hardware button lamp (keyboard lamp and key lamp) is on, CPU 300 turns off the hardware button lamp. Further, if the software buttons (software keyboard and software buttons) are not displayed on display panel 172, CPU 300 displays the software buttons.

At S1220, CPU 300 displays an initial image (mode selection image) of image forming apparatus 150 on display panel 172.

Referring to FIG. 6, analysis (maintenance) of the user management table shown in FIG. 4 will be described.

At S1300, CPU 300 determines whether or not the time for analysis is reached. Here, by way of example, if 24 hours has passed from the last analysis, CPU 300 determines that the time for analysis has come. If it is determined that the analysis time has been reached (YES at S1300), the process proceeds to S1310. Otherwise (NO at S1300), the process ends.

At S1310, CPU 300 reads the user management table from HDD 302. At S1320, CPU 300 calculates the number of samples (=the number of use of software buttons at the time of log-in+the number of use of hardware buttons at the time of login) for the user as the object of analysis.

At S1330, CPU 300 determines whether or not the number of samples for the user is equal to or higher than a threshold value. By way of example, "10" is set as the threshold value. If the number of samples is equal to or higher than the threshold value (YES at S1330), the process proceeds to S1340. Otherwise (NO at S1330), the process proceeds to S1390.

At S1340, CPU 300 calculates the ratio S (=the number of use of software buttons at the time of log-in/the number of samples) of the user using the software buttons, and the ratio H (=the number of use of hardware buttons at the time of log-in/the number of samples) of the user using the hardware buttons.

At S1350, CPU 300 determines whether or not the ratio H is equal to or higher than a device determining ratio. By way of example, "80%" is set as the device determining ratio. If the ratio H is determined to be equal to or higher than the device determining ratio (YES at S1350), the process proceeds to S1360. Otherwise (NO at S1350), the process proceeds to S1370.

At S1360, CPU 300 determines the hardware buttons to be the operation device to be used by the user, and stores the determination in the user management table. Thereafter, the process proceeds to S1390.

At S1370, CPU 300 determines whether or not the ratio S is equal to or higher than a device determining ratio. By way of example, "80%" is set as the device determining ratio. If the ratio S is determined to be equal to or higher than the device determining ratio (YES at S1370), the process proceeds to S1380. Otherwise (NO at S1370), the process proceeds to S1390.

At S1380, CPU 300 determines the software buttons to be the operation device to be used by the user, and stores the determination in the user management table.

At S1390, CPU 300 determines whether or not the process for every user stored in the user management table has been completed. If it is determined that the process for every user has been completed (YES at S1390), the process ends. Otherwise (NO at S1390), the process returns to S1320, and the process for the next user is executed.

Though the device determining ratio at S1350 and the device determining ratio at S1370 are set to the same value of "80%", the device determining ratio for ratio H at S1350 may be set higher and the device determining ratio for ratio S at S1370 may be set lower, for example, if use of the software buttons rather than the hardware buttons by the user is preferred.

[Operation]

The operation of image forming apparatus 150 in accordance with the present embodiment based on the configuration and flowchart as above will be described with reference to FIGS. 7 to 13. Prior to the description using these figures, the operation of analyzing the user management table will be described.

Operation for Determining Operation Device to be Used by the User

By way of example, at an interval of 24 hours (YES at S1300), the user management table is read from HDD 302 (S1310), and the process for analyzing the operation device for the registered user is executed.

The number of samples for the user is calculated (S1320), and if the number of samples for the user is equal to or larger than the threshold value (YES at S1330) and the calculated ratio H of the number of use of hardware is equal to or higher than the device determining ratio (YES at S1350), the hardware buttons are determined to be the operation device to be used by the user and stored (S1360).

If the number of samples for the user is equal to or larger than the threshold value (YES at S1330) and the calculated ratio S of the number of use of software is equal to or higher than the device determining ratio (YES at S1370), the software buttons are determined to be the operation device to be used by the user and stored (S1380).

If the number of samples for the user is smaller than the threshold value (NO at S1330), or the calculated ratio H of the number of use of hardware is smaller than the device determining ratio (NO at S1350) and the calculated ratio S of the number of use of hardware is smaller than the device determining ratio (NO at S1370), the operation device to be used by the user is not determined.

In this manner, the device to be used by the user is determined and stored in the user management table, user by user. As described above, if the number of samples is small and the use history of the user cannot correctly be determined, or if ratios H and S are both smaller than the device determining ratio and the use history of the user cannot correctly be determined (if the operation preference cannot correctly be determined), the operation device to be used by the user is not determined.

Log-In Operation Using Software Buttons

Figure 7:
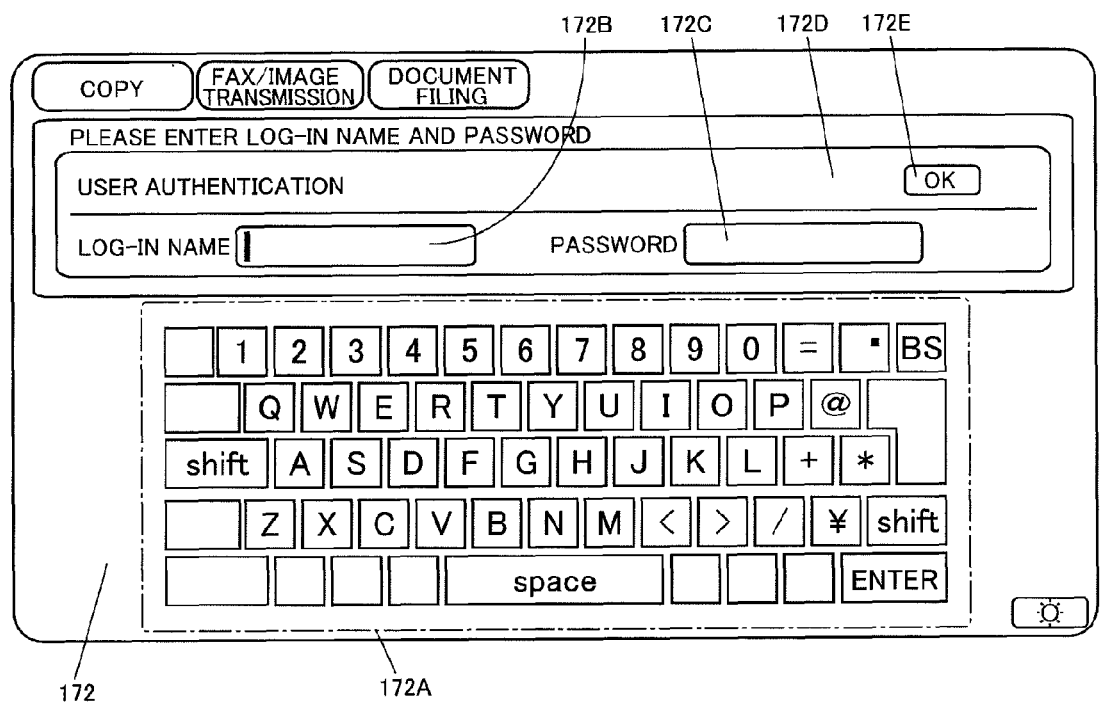
FIGS. 7 and 8 show exemplary images displayed on the display panel of the image forming apparatus in accordance with the first embodiment of the present invention.

Login by the user using software buttons when the log-in image shown in FIG. 7 is displayed on display panel 172 (S1000) will be described.

As shown in FIG. 7, here, software keyboard 172A, the first text field 172B for inputting the log-in name, the second text field 172C for inputting a password, a user authentication image display area 172D and an OK button 172E are displayed on display panel 172. The input cursor is in the first text field 172B.

When the user inputs the log-in name using software keyboard 172A (YES at S1010, NO at S1020), the text input by using software keyboard 172A is displayed in the first text field 172B (S1040).

Figure 8:
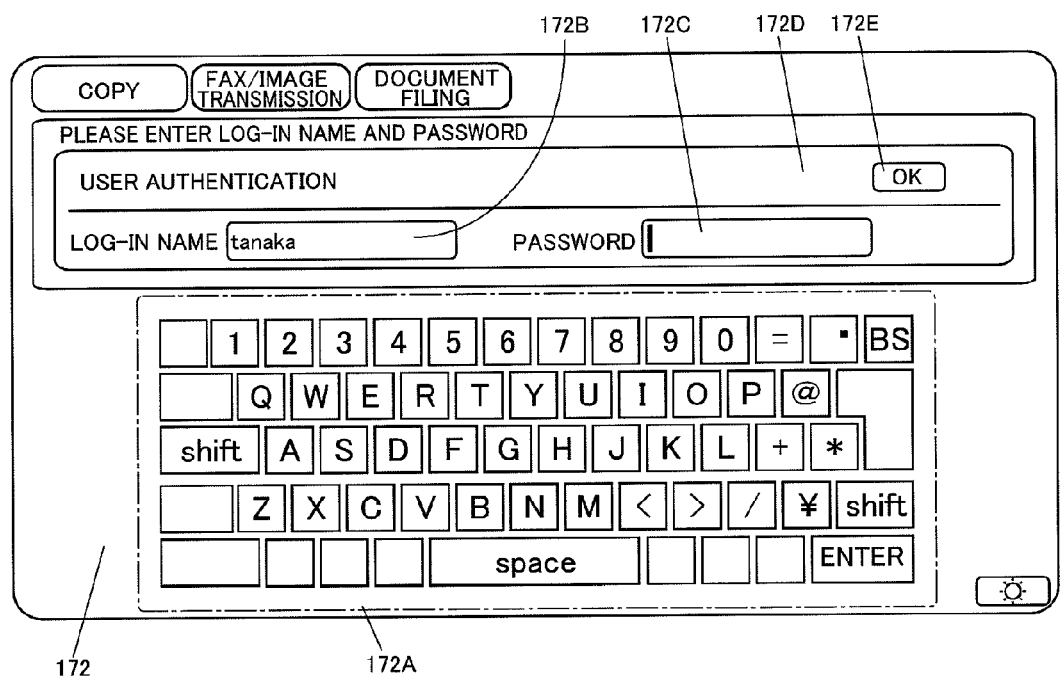

When the input of log-in name to the first text field 172B ends, the user presses ENTER key or the like, and moves the input cursor to the second text field 172C (YES at S1050). At this time, the image on display panel 172 is as shown in FIG. 8.

As the input to the first text field 172B ends (YES at S1050), it is determined that the operation device is not the hardware buttons (NO at S1060). At this time, if the hardware button lamp is on, it is turned off (S1080).

Further, when the user inputs a password using software keyboard 172A (YES at S1090), the text input by using software keyboard 172A is displayed in the second text field 172C (S1100).

When the input of password to the second text field 172C ends, the user presses OK button 172E, and completes the input to the second text field (YES at S1110).

In this manner, at the time when input to the first text field 172B is completed, the software buttons are set as the operation device to be used by the user to input the password to the second text field 172C. Therefore, at the time when the password is input to the second text field 172C, software keyboard 172A is kept displayed on display panel 172. Since software keyboard 172A is displayed on display panel 172, the user can easily understand that software keyboard 172A is the operation device. In an image forming process of image forming apparatus 150, the user also uses display panel 172 having software keyboard 172A and the like displayed to allow operation, to input requests to image forming apparatus 150.

Log-In Operation Using Hardware Buttons

Figure 9:
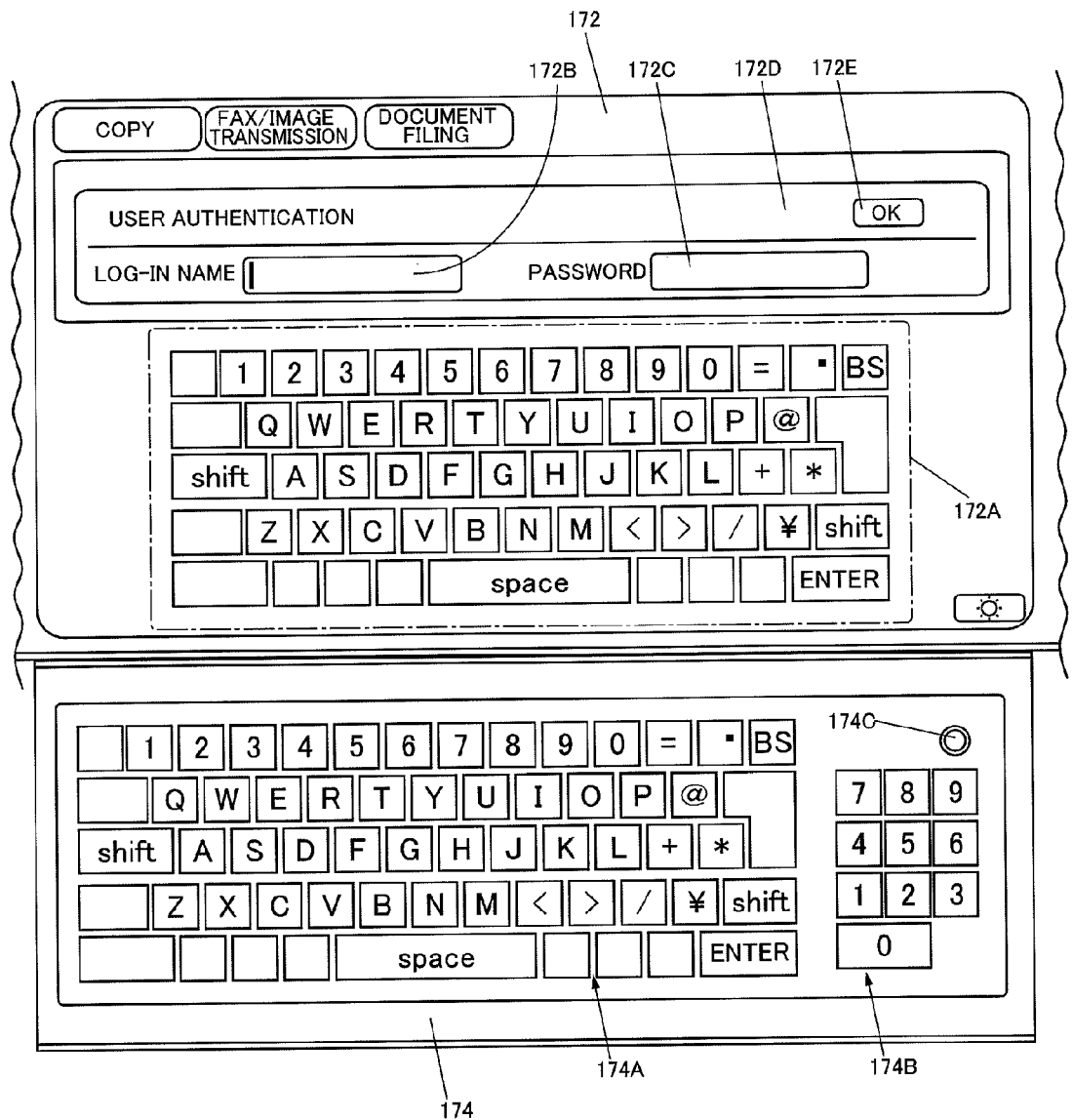
FIGS. 9 to 13 are top views of the operation unit of the image forming apparatus in accordance with the first embodiment of the present invention.

Log-in by the user using external keyboard 174 (hardware buttons) when the log-in image shown in FIG. 9 is displayed on display panel 172 (S1000) will be described.

As shown in FIG. 9, here, software keyboard 172A, the first text field 172B for inputting the log-in name, the second text field 172C for inputting a password, a user authentication image display area 172D and an OK button 172E are displayed on display panel 172. Further, here, external keyboard 174 is drawn out and usable, as shown in FIG. 9. Keyboard 174 includes key buttons 174A, ten keys 174B and a hardware button lamp (keyboard lamp) 174C. Key buttons 174A include approximately 40 keys, including at least 26 alphabets. Ten keys 174B include at least keys from 0 to 9. In FIG. 9, hardware button lamp 174C is off. It is noted that input through keyboard 174 is possible even when hardware button lamp 174C is off. The input cursor is in the first text field 172B.

When the user inputs the log-in name using keyboard 174 (YES at S1010, YES at S1020), hardware button lamp 174C is turned on (S1030). The text input by using keyboard 174 is displayed in the first text field 172B (S1040).

Figure 10:
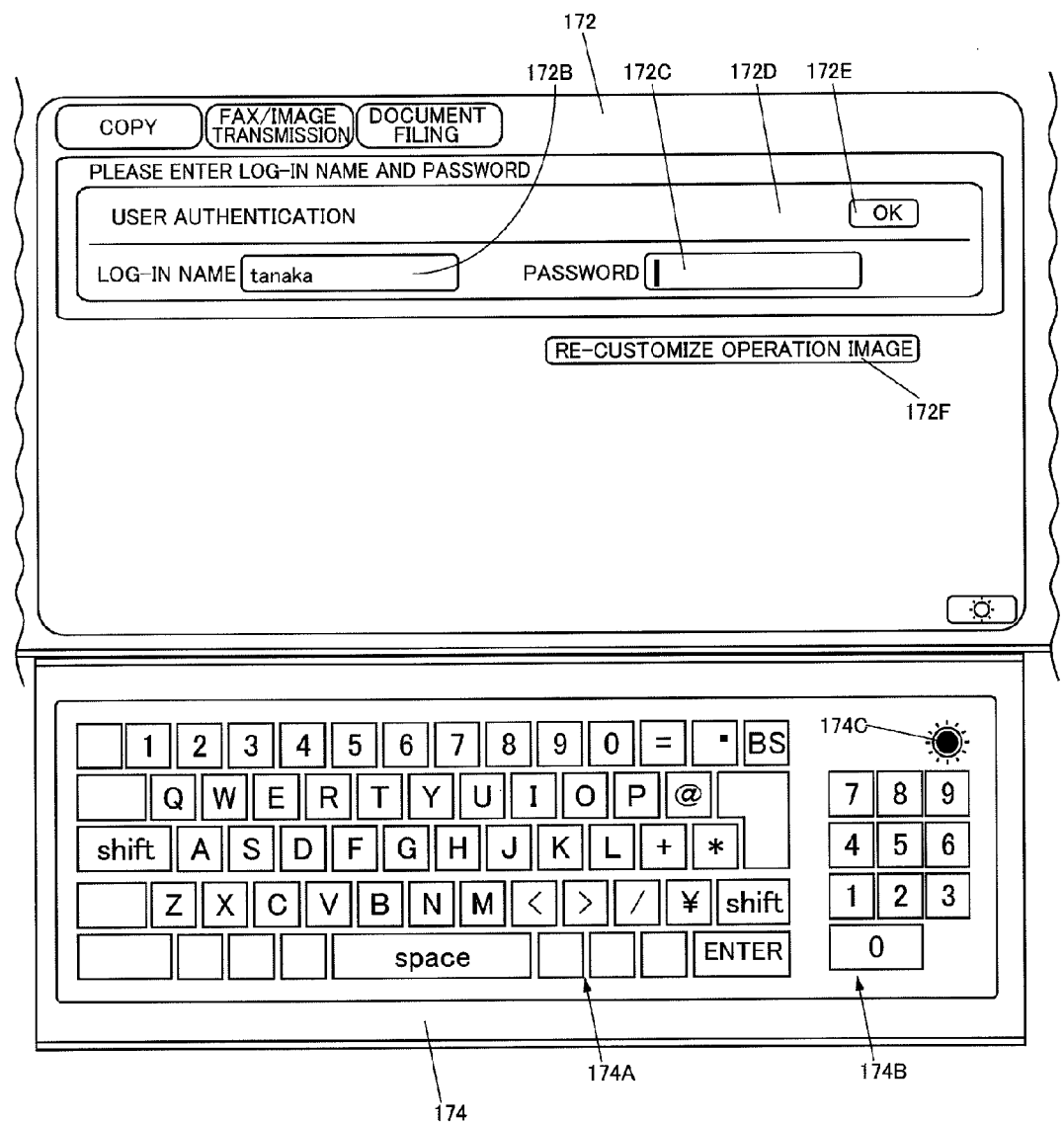
Figure 11:
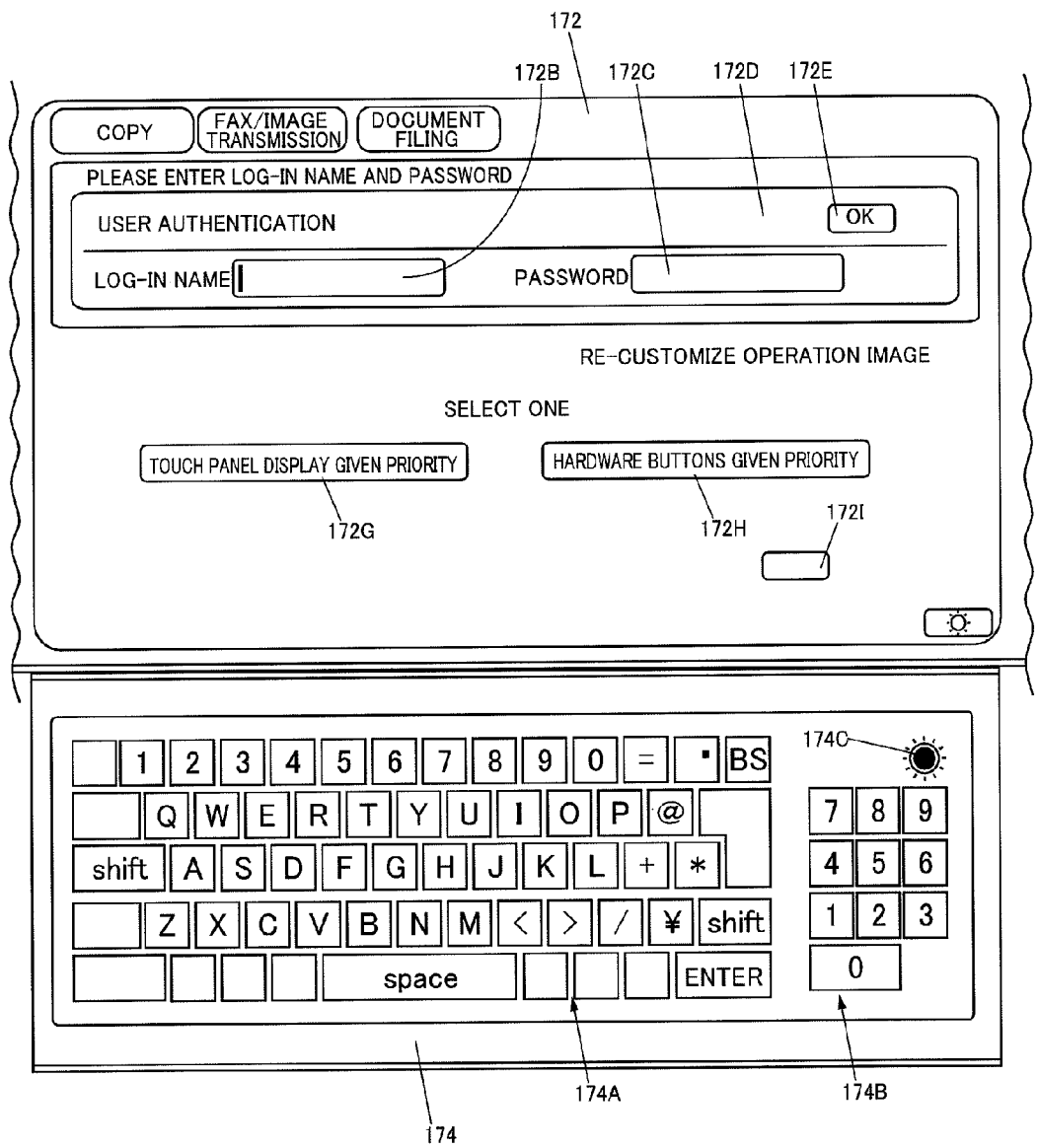

When the input of log-in name to the first text field 172B ends, the user presses ENTER key or the like, and moves the input cursor to the second text field 172C (YES at S1050). At this time, the image on display panel 172 is as shown in FIG. 10.

As the input to the first text field 172B ends (YES at S1050), it is determined that the operation device is the hardware buttons (YES at S1060). At this time, software keyboard 172A that has been displayed on display panel 172 is erased as shown in FIG. 10 (S1070). Since the log-in name has been input to the first text field 172B using keyboard 174 (YES at S1020, S1030), hardware button lamp 174C is lit as shown in FIG. 10.

Further, when the user inputs a password using keyboard 174 (YES at S1090), the text input by using keyboard 174 is displayed in the second text field 172C (S1100).

When the input of password to the second text field 172C ends, the user presses ENTER key or the like among key buttons 174A, and completes the input to the second text field (YES at S1110).

In this manner, at the time when input to the first text field 172B is completed, the hardware buttons are set as the operation device to be used by the user to input the password to the second text field 172C. Therefore, at the time when the password is input to the second text field 172C, display of software keyboard 172A is erased from display panel 172. Meanwhile, hardware button lamp 174C indicating that the hardware buttons are the operation device is turned on. Since software keyboard 172A is not displayed on display panel 172 and the hardware lamp is on, the user can easily understand that keyboard 174 and operation panel 170 are the operation devices. In an image forming process of image forming apparatus 150, the user also uses keyboard 174 and operation panel 170, to input requests to image forming apparatus 150.

As shown in FIG. 10, on the area from which software keyboard 172A has been erased, a button 172F of "RE-CUSTOMIZE OPERATION IMAGE" is displayed. When the user presses the "RE-CUSTOMIZE OPERATION IMAGE" button, the display is switched to the image shown in FIG. 11. On display panel 172, "TOUCH PANEL DISPLAY GIVEN PRIORITY" button 172G and "HARDWARE BUTTONS GIVEN PRIORITY" button 172H are displayed. When the user presses either of the buttons (when pressed, the button is highlighted) and then presses OK button 172I, the operation device to be used by the user is re-customized.

When "TOUCH PANEL DISPLAY GIVEN PRIORITY" is selected, hardware button lamp 174C is turned off and software keyboard 172A is displayed on display panel 172. When "HARDWARE BUTTONS GIVEN PRIORITY" is selected, hardware button lamp 174C is turned on, and software keyboard 172A is not displayed on display panel 172.

Further, in place of pressing "RE-CUSTOMIZE OPERATION IMAGE" button 172F of FIG. 10, key buttons 174A of keyboard 174 may be used. By way of example, when two or three key buttons 174A of keyboard 174 are pressed simultaneously, the same process as when "RE-CUSTOMIZE OPERATION IMAGE" button 172F is pressed may be executed. By such an approach, the operation device can easily be re-customized even by a user who uses hardware buttons only.

Further, in place of pressing "TOUCH PANEL DISPLAY GIVEN PRIORITY" button 172G or "HARDWARE BUTTONS GIVEN PRIORITY" button 172H, key buttons 174A of keyboard 174 may be used. Specifically, re-customization may be done by pressing a specific key button 174A of keyboard 174. For example, when the key "T" (touch-panel display) or "S" (software) is pressed, the same process as when "TOUCH PANEL DISPLAY GIVEN PRIORITY" button 172G is pressed may be executed. When the key "H" (hardware) is pressed, the same process as when "HARDWARE BUTTONS GIVEN PRIORITY" button 172H is pressed may be executed. By such an approach, the operation device can easily be re-customized even by a user who uses hardware buttons only.

Operation When Operation Device is Selected Based on Use History After Log-In

If the operation device is set to be selected based on use history (YES at S1160) after the user has logged-in (S1120, YES at S1130), the user management table is read from HDD 302 (S1170). Using the user management table, whether or not the operation device for the logged-in user has already been determined is determined (S1180).

For instance, for the user having the user name "USER0003", the software buttons are determined to be the operation device, as shown in the user management table of FIG. 4 (YES at S1180, NO at S1190). Therefore, if hardware button lamp 174C is on, it is turned off. If software buttons (software keyboard 172A or software buttons) are not shown on display panel 172, the buttons are displayed (S1210).

Figure 12:
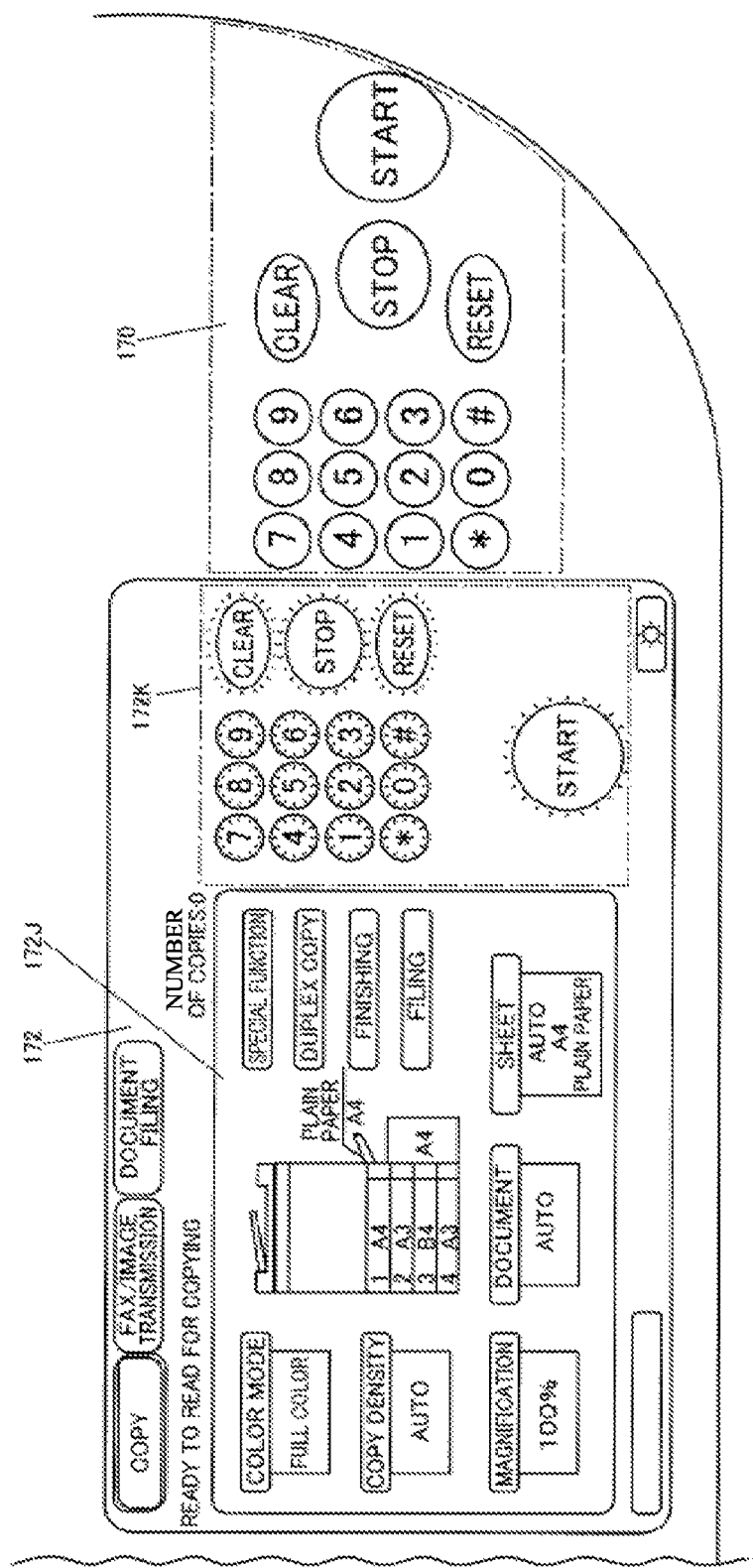

FIG. 12 is a top view of operation unit 166 displaying the initial image of image forming apparatus 150 when the software buttons are selected as the operation device. It is noted that the image shown in FIG. 12 is the initial image that is also displayed when the log-in name is input to the first text field using software keyboard 172A if the operation device for the user is not yet determined or the operation device setting flag is not set. In operation unit 166 shown in FIG. 12, external keyboard 174 is retracted.

As shown in FIG. 12, software buttons 172K are displayed on display panel 172, and each software button is lit brightly. On the other hand, hardware button lamp (key lamp) embedded in each button on operation panel 170 is not lit. Therefore, a user who prefers software buttons as the operation device notes the software buttons that are lit (button on display panel 172) rather than the hardware buttons (buttons on operation panel 170) that are not lit, and operates the software buttons.

Further, for the user having the user name "USER0004", the hardware buttons are determined to be the operation device, as shown in the user management table of FIG. 4 (YES at S1180, YES at S1190). Therefore, if hardware button lamp 174C is off, it is turned on. If software buttons (software keyboard 172A or software buttons) are shown on display panel 172, the buttons are erased (S1200).

Figure 13:
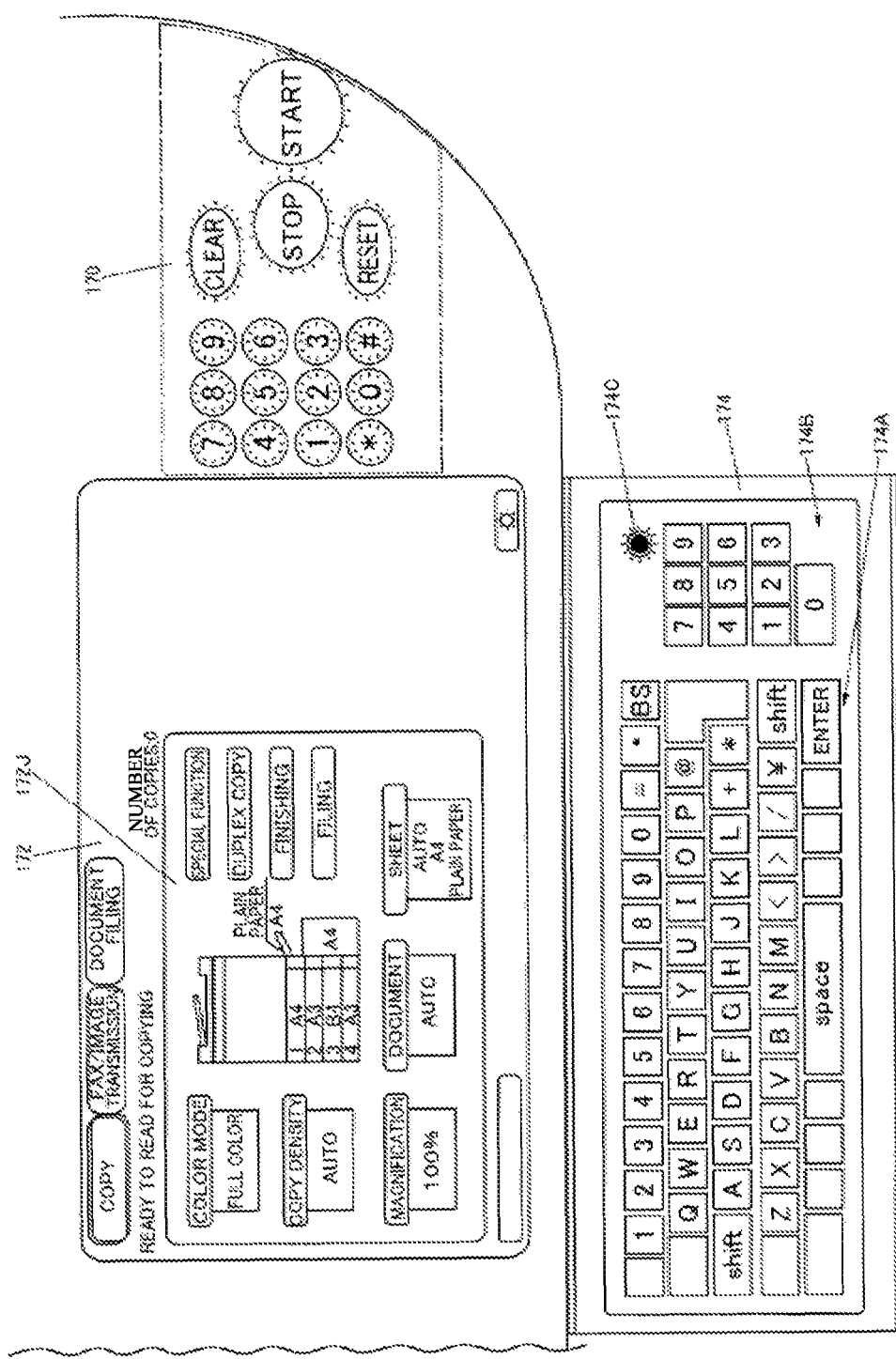

FIG. 13 is a top view of operation unit 166 displaying the initial image of image forming apparatus 150 when the hardware buttons are selected as the operation device. It is noted that the image shown in FIG. 13 is the initial image that is also displayed when the log-in name is input to the first text field using keyboard 174 if the operation device for the user is not yet determined or the operation device setting flag is not set. In operation unit 166 shown in FIG. 13, external keyboard 174 is drawn out.

As shown in FIG. 13, software buttons 172K are not displayed on display panel 172. On the other hand, hardware button lamp (key lamp) embedded in each button on operation panel 170 is lit, and hardware button lamp 174C of external keyboard 174 is lit. Therefore, a user who prefers hardware buttons as the operation device notes the hardware buttons that are lit (buttons on operation panel 170, and key buttons 174A and ten keys 174B of external keyboard 174) rather than the software buttons (buttons on display panel 172) that are not displayed, and operates the hardware buttons.

As described above, in the image forming apparatus in accordance with the present embodiment, when a plurality of operation devices are provided for user authentication as one command (input of log-in name and password), customization is automatically executed to prevent one operation device from interfering with another.

Specifically, the operation device used for inputting log-in name to the first text field at the time of log-in is set as the operation device preferred by the user. The set operation device is used for inputting password to the second text field. At the time of inputting password to the second text field, lamp is turned on for the selected operation device, so that the user notes the set operation device. When the software buttons are not selected, the software buttons are erased from the display panel.

Further, the number of use of each operation device at the time of log-in is stored user by user, and the user preference is analyzed based on the use history of the user at an appropriate time interval. The operation device after log-in authentication is set based on the analyzed user preference.

In this manner, based on the operation itself by the user at the time of log-in or based on the analysis of operation history, the customization as to which of the plurality of operation devices is to be used can be executed.

<Second Embodiment>

In the following, electronic equipment in accordance with a second embodiment of the present invention will be described. As in the first embodiment, the electronic equipment in accordance with the present embodiment is an image forming apparatus as one type of image processing apparatuses. In the present embodiment also, as in the first embodiment, the operation console in accordance with the present invention may be applicable to an image processing apparatus or electronic equipment other than the image forming apparatus. The electronic equipment in accordance with the present embodiment may be any device provided that a plurality of operation methods (for example, menu operation and gesture operation) are provided for one command and that it includes an operation console that allows easy customization to give priority to the operation method required by the user, without necessitating special setting by the user.

The configurations and functions of the image forming apparatus are the same as those of the first embodiment described above and, therefore, detailed description thereof will not be repeated here.

The image forming apparatus in accordance with the present embodiment is different from that of the first embodiment in the control structure of the program executed by the CPU. The image forming apparatus in accordance with the present embodiment may not include external keyboard 174 or add-on operation panel 170 of the first embodiment. The apparatus, however, is adapted to allow gesture operation method and conventional menu-type operation method not involving the gesture operation. In this regard, the electronic equipment in accordance with the present embodiment always has a touch-panel display (display panel) for realizing the gesture operation method. Here, the display panel in accordance with the present embodiment displays pieces of information different from those displayed on display panel 172 in accordance with the first embodiment and, therefore, it will be denoted as display panel 272. Other components are the same as those of the first embodiment described above. Since the configurations and functions are the same as those of the first embodiment described above, description will be given in the following using the reference characters of FIGS. 1 to 3 for convenience.

[Software Configuration]

Figure 14:
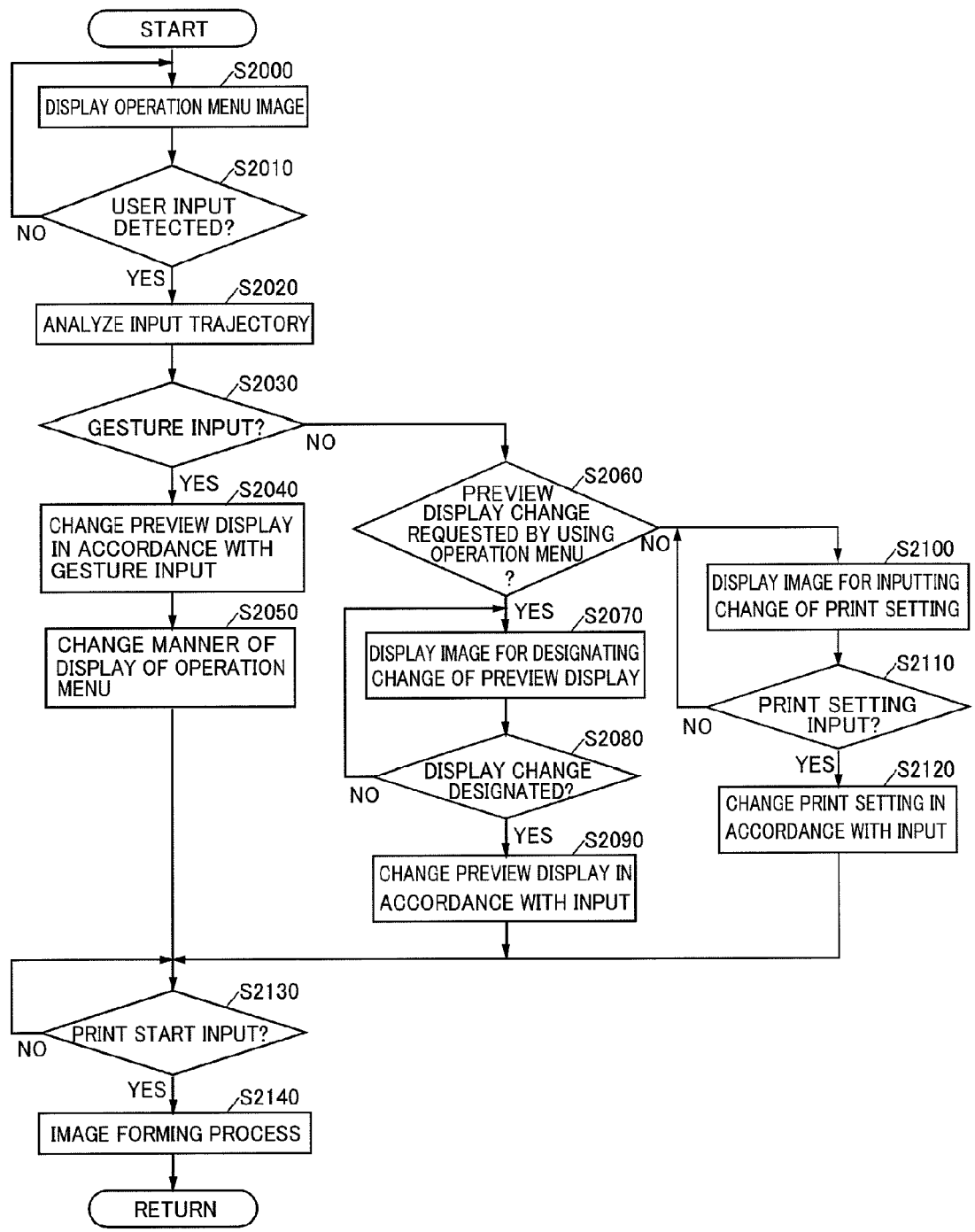
FIG. 14 is a flowchart representing a control structure of a program executed by an image forming apparatus in accordance with a second embodiment of the present invention.

The program shown in FIG. 14 is for processing an operation menu including both the menu selection method and the gesture operation method, in the preview display before printing (copying). By the operation menu, it is possible to change the preview image (designation by the menu selection method and the gesture operation method) and to change the number of copies and the like.

As in the first embodiment described above, CPU 300 of image forming apparatus 150 executes, in parallel with such a program, a program for realizing general functions of an image forming apparatus. The program, however, is not directly related to the characteristic portion of the present invention and, therefore, details thereof will not be described here.

Referring to FIG. 14, at S2000, CPU 300 displays an operation menu image on display panel 272. At this time, together with a preview image before printing, an operation menu consisting of a plurality of commands is displayed. By gesture-operating the preview display portion, it is possible to input a command object and a command together. By way of example, assume that a plurality of pages are displayed on display panel 272. By a gesture operation of double-tap, that is, by lightly tapping twice a position where a certain page preview is displayed, both the preview page as the command object and zooming as the command can be input.

At S2010, CPU 300 determines whether or not a user input is detected. Here, CPU 300 determines whether or not a user input is detected, based on whether or not the user pressed any item displayed on display panel 272. If it is determined that a user input is detected (YES at S2010), the process proceeds to S2020. Otherwise (NO at S2010), the process returns to S2000, and the process is repeated until it is determined that a user input is detected.

At S2020, CPU 300 analyzes a trajectory of the user input. Here, CPU 300 detects a position pressed by the user and the change with time of the pressed position. Specifically, the positions where selection buttons are displayed on the operation menu, the position where the touch-panel is pressed and the movement of the pressed position are compared, so that whether or not the operation has been done using the operation menu or the operation has been done by gestures is analyzed. The gesture operations include tap, double-tap, drag, flick, pinch, pinch-out, pinch-in and the like.

At S2030, CPU 300 determines whether or not the user input is a gesture input (input by a gesture operation). If the user input is determined to be a gesture input (YES at S2030), the process proceeds to S2040. Otherwise (NO at S2030), the process proceeds to S2060.

At S2040, CPU 300 changes the preview display in accordance with the gesture operation, and displays the changed image on display panel 272.

At S2050, CPU 300 changes the manner of display of operation menu. Here, an item corresponding to the command designated by the gesture operation (zoom button on operation panel) is less likely used. Therefore, CPU 300 makes the button corresponding to this item displayed on display panel 272 less noticeable. By way of example, the position is changed, the size is reduced to be less noticeable, or the button is erased. Thereafter, the process proceeds to S2130.

At S2060, CPU 300 determines whether or not the user input is a request for changing preview display using the operation menu. Here, CPU 300 determines whether or not it is a request for changing preview display using the operation menu based on the positions where selection buttons of operation menu are displayed on display panel 272 and the position where the touch-panel is pressed. If it is determined that the user input is a request for changing preview display using the operation menu (YES at S2060), the process proceeds to S2070. Otherwise (NO at S2060), the process proceeds to S2100.

At S2070, CPU 300 displays an image designating a change in the preview display (for example, an image allowing input of enlargement ratio when the preview image is to be enlarged), on display panel 272.

At S2080, CPU 300 determines whether or not a designation is done to change the preview display. If it is determined that a designation is done to change the preview display (YES at S2080), the process proceeds to S2090. Otherwise (NO at S2080), the process proceeds to S2070.

At S2090, in accordance with the designation, CPU 300 changes the preview image, and displays the image on display panel 272. Thereafter, the process proceeds to S2130.

At S2100, CPU 300 displays an image for inputting a change in print setting (for example, change in the number of copies to be printed, change of a page as the object of printing), on display panel 272.

At S2110, CPU 300 determines whether or not print setting is input. If it is determined that print setting for a document as the object of printing of which preview is displayed is input (YES at S2110), the process proceeds to S2120. Otherwise (NO at S2110), the process returns to S2100.

At S2120, CPU 300 changes the print setting in accordance with the input print setting. Thereafter, the process proceeds to S2130.

At S2130, CPU 300 determines whether or not print start is input. Here, CPU 300 determines that print start is input when "PRINT START" button displayed on display panel 272 is pressed. If it is determined that print start is input (YES at S2130), the process proceeds to S2140. Otherwise (NO at S2130), the process returns to S2130.

At S2140, CPU 300 prints the designated document in accordance with the designated print setting, on a sheet of recording paper using image forming unit 154.

[Operation]

The operation of image forming apparatus 150 in accordance with the present embodiment based on the configuration and flowchart as above will be described with reference to FIGS. 15 to 19.

Figure 15:
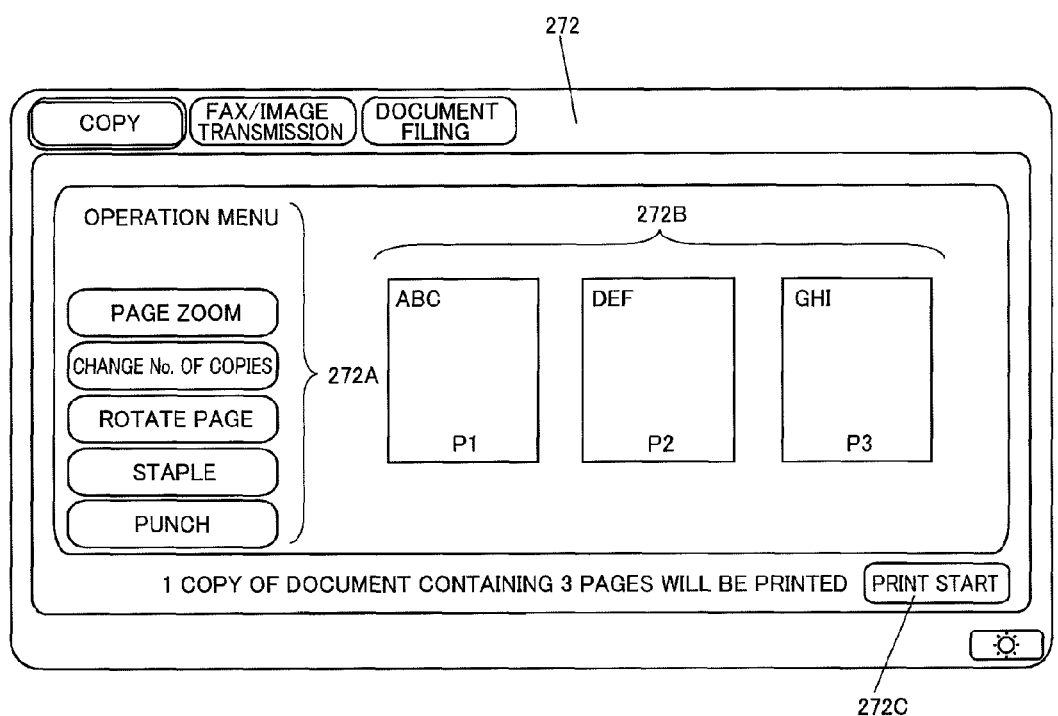
FIGS. 15 to 19 show exemplary images displayed on the display panel of the image forming apparatus in accordance with the second embodiment of the present invention.

By way of example, in image forming apparatus 150, when the user selects the copy mode and a document is scanned, the operation menu image is displayed on display panel 272 (S2000). Here, on display panel 272, an operation menu 272A, previews 272B of three pages, and PRINT START button 272C are displayed, as shown in FIG. 15.

For instance, if the user wishes to enlarge the display of the previewed first page, he/she double-taps the position of preview 272B of the first page. Here, it is assumed that double-tap is set to be processed as zooming of the preview display. Until the preview image is enlarged to the maximum size, the preview display is enlarged by a prescribed enlargement ratio and displayed every time the double-tapping is repeated. If double-tapped after the display is enlarged to the maximum, the preview display is reduced by a prescribed reduction ratio.

Figure 16:
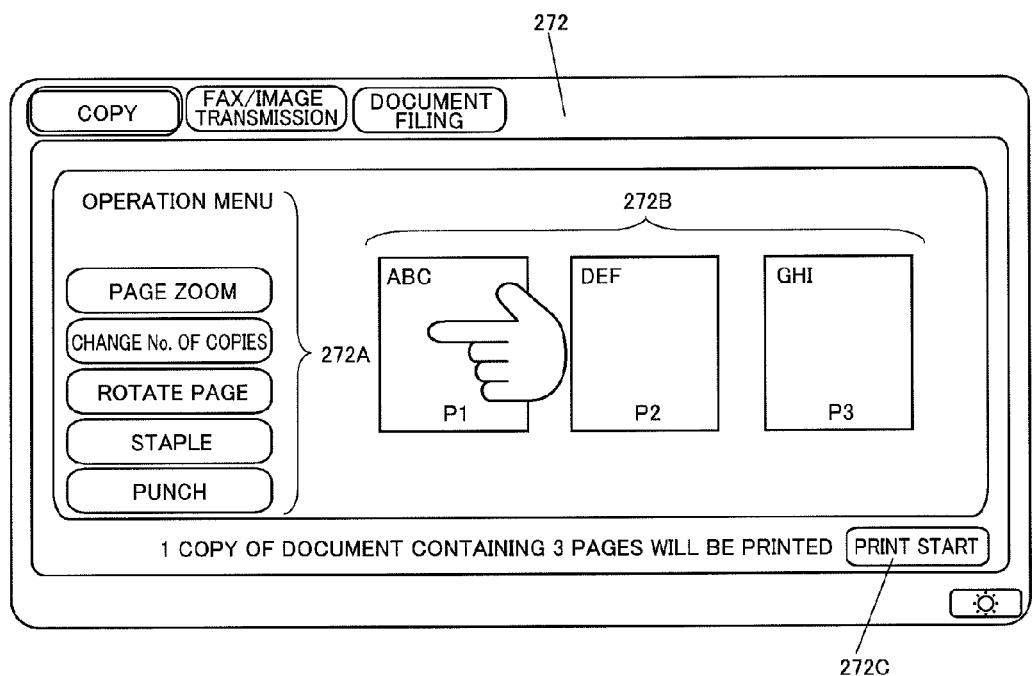
Figure 17:
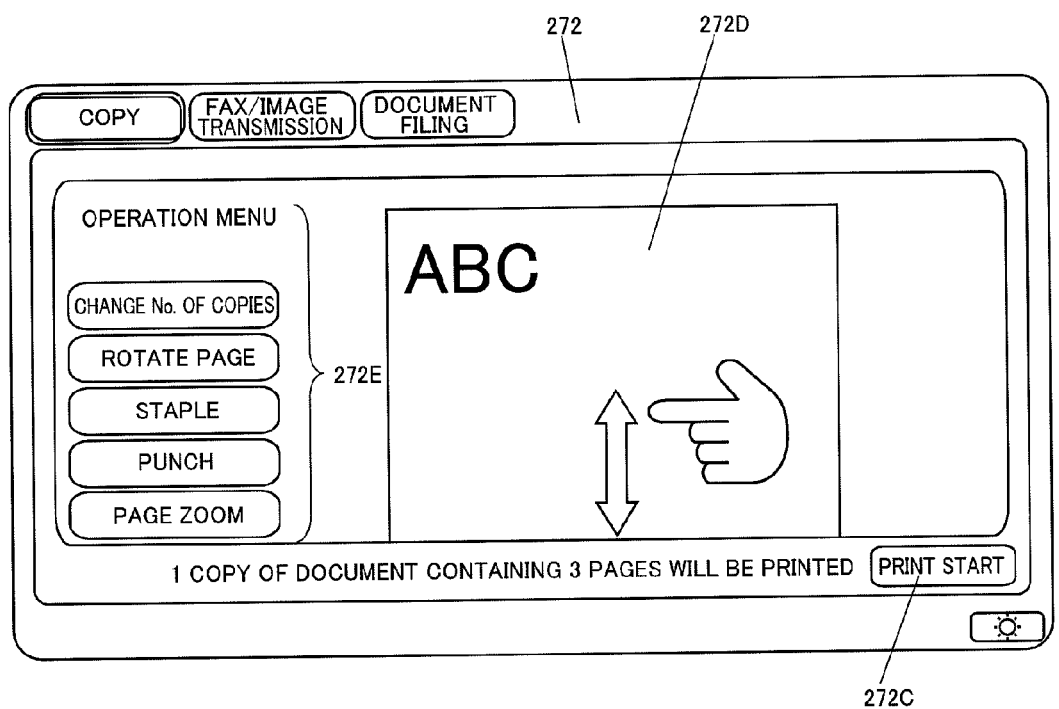

As shown in FIG. 16, if the user double-taps the position of preview 272B of the first page (YES at S2010), an input trajectory is analyzed (S2020), and it is determined to be a gesture input (YES at S2030). Since the double-tap operation is set to be processed as zooming of the preview image, preview display 272D is enlarged and displayed on display panel 272 as shown in FIG. 17 (S2040). As shown in FIG. 17, the enlarged preview display 272D may be scrolled upward/downward by a drag operation as one of the gesture operations.

Figure 18:
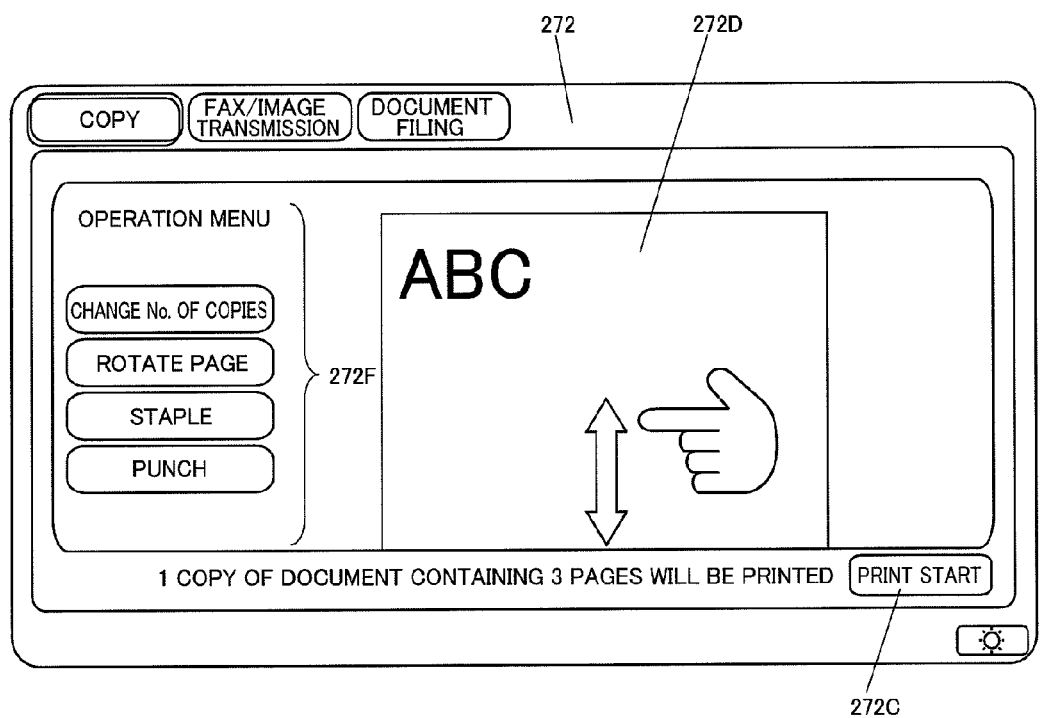
Figure 19:
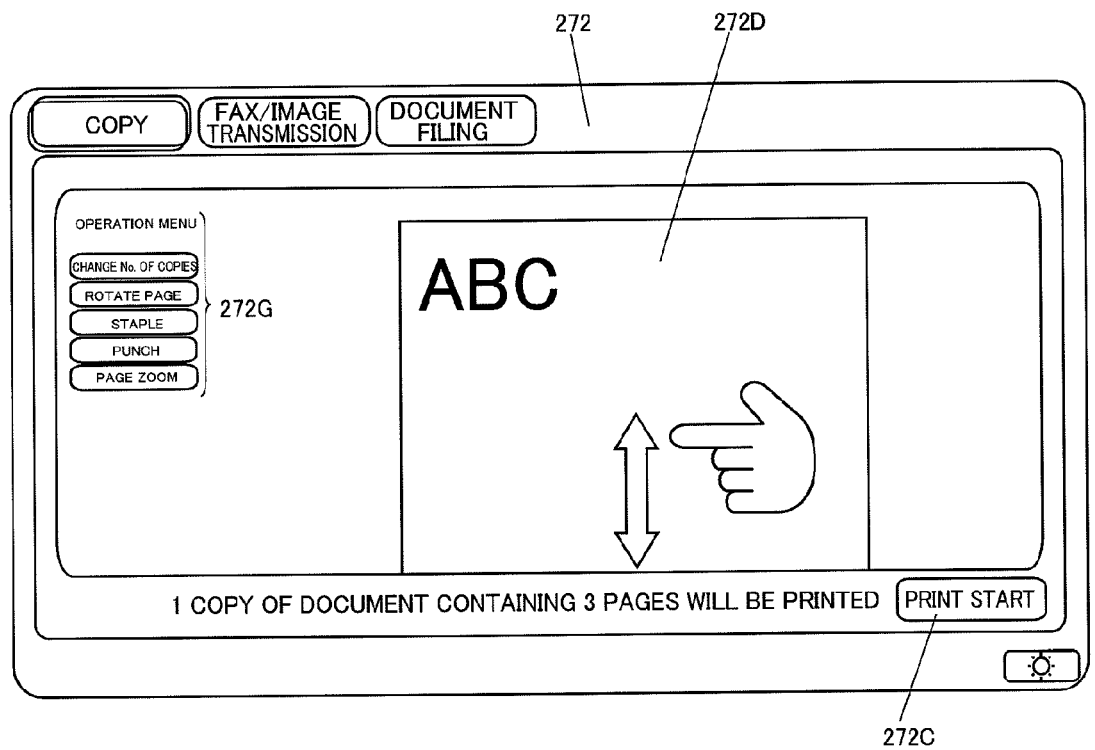

In this manner, the manner of display of the preview display is changed without using operation menu 272A. In such a situation, use of the item (zoom button) on the operation menu corresponding to the command designated by the gesture operation is unlikely. Therefore, the zoom button is moved to the lowermost position of operation menu 272E (S2050) as shown in FIG. 17. Alternatively, the zoom button may be erased from operation menu 272F as shown in FIG. 18, or operation menu 272G itself may be displayed in small size as shown in FIG. 19.

If the user wishes to have the display of the previewed first page enlarged by the menu selection method, image forming apparatus 150 operates in the following manner. The user presses the position of preview 272B of the first page so that it is highlighted, and then, he/she presses "ZOOM" button on operation menu 272A (YES at S2060). Thereafter, an image for designating enlargement ratio or reduction ratio is displayed on display panel 272 (S2070). If the enlargement ratio or reduction ratio is designated (YES at S2080), the preview display is given in the designated magnification (S2090). Here, the manner of display of the operation menu is not changed.

If the user wishes to change print setting for the previewed document, he/she presses "COPY No. CHANGE" of operation menu 272A (NO at S2060). Thereafter, an image for inputting change of print setting is displayed on display panel 272 (S2100). When the number of copies is input (YES at S2110), the number of copies is changed to the designated number (S2120). Here, the manner of display of the operation menu is not changed.

After the preview display is changed or the print setting is changed in this manner and PRINT START button 272C is pressed (YES at S2130), an image is formed on a sheet of paper (S2140).

As described above, by the image forming apparatus in accordance with the present embodiment, when a plurality of operation methods (gesture operation method and menu selection method) are provided for zooming the preview display as one command, customization can be done easily to give priority to the operation method requested by the user, without necessitating any special setting by the user. Specifically, if the user selects the gesture operation method, the manner of display of the non-selected operation method is changed to a display of lower priority, while the selected operation method is displayed with priority. The manner of display of lower priority includes changing the position of a selection button, erasing a selection button, or reducing the size of a selection button used, for example, in the menu selection method.

As in the first embodiment, the number of operations by the user using the gesture operation method and the number of operations using the menu selection method may be stored, and the manner of display on the display panel may be changed based on the operation history by the user. By such an approach, if either one of the gesture operation method and the menu selection method is used continuously or frequency of use of one of these methods is high, the method not used or the method of low frequency of use may not be displayed on the display panel. Even when a method was once non-displayed, the display of the method may be resumed if operation corresponding to the other method which was displayed is not done for a predetermined time period. It is desirable that even when a method was once determined as non-displayed, the display of the method can be resumed upon request by the user.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An operation console provided on an apparatus as an object of control, the operation console comprising:
    a first operation unit allowing a user to input a request to said apparatus as the object of control, the first operation unit including a software button displayed on a touch-panel display;
    a second operation unit allowing the user to input said request to said apparatus as the object of control, the second operation unit including a hardware button, the first and second operation units being operable by the user in a mutually exclusive manner;
    a determining unit detecting an operation of said first operation unit and said second operation unit by the user, for determining which of said first operation unit and said second operation unit is to be given priority;
    a display unit displaying information to the user, the display unit including the touch-panel display and a pilot lamp for the hardware button;
    a user identification unit identifying the user;
    a storage unit storing, for a plurality of identified users, operation history of each identified user; and
    a control unit controlling said display unit such that a piece of information assisting the user to recognize said first operation unit or said second operation unit that is determined to be given priority is displayed;
    wherein said determining unit determines which of said first operation unit and said second operation unit is to be given priority for the identified user, based on the stored operation history of the identified user;
    and wherein
    said control unit controls said display unit such that, when it is determined to give priority to said second operation unit, said pilot lamp is lit or flickered and said software button is erased from said touch panel display.

* * * * *